United States Patent
Zhang et al.

(10) Patent No.: US 12,121,880 B2
(45) Date of Patent: Oct. 22, 2024

(54) CATALYST COMPONENT FOR OLEFIN POLYMERIZATION, PREPARATION METHOD THEREOF, AND CATALYST INCLUDING SAME

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Rui Zhang, Beijing (CN); Zhong Tan, Beijing (CN); Qilong Zhou, Beijing (CN); Xiudong Xu, Beijing (CN); Fengkui Li, Beijing (CN); Shanshan Yin, Beijing (CN); Jinhua Yu, Beijing (CN); Weiwei Song, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 891 days.

(21) Appl. No.: 17/057,980

(22) PCT Filed: May 21, 2019

(86) PCT No.: PCT/CN2019/087787
§ 371 (c)(1),
(2) Date: Nov. 23, 2020

(87) PCT Pub. No.: WO2019/223683
PCT Pub. Date: Nov. 28, 2019

(65) Prior Publication Data
US 2021/0205787 A1 Jul. 8, 2021

(30) Foreign Application Priority Data

May 21, 2018 (CN) .................. 201810489139.5
May 21, 2018 (CN) .................. 201810489207.8
May 21, 2018 (CN) .................. 201810489282.4

(51) Int. Cl.
*C08F 4/64* (2006.01)
*B01J 21/06* (2006.01)
(Continued)

(52) U.S. Cl.
CPC ........... *B01J 21/063* (2013.01); *B01J 31/143* (2013.01); *C08F 2/06* (2013.01); *C08F 4/649* (2013.01);
(Continued)

(58) Field of Classification Search
CPC ...... C08F 4/614; C08F 4/6143; C08F 4/6494; C08F 10/00; C08F 10/02
See application file for complete search history.

(56) References Cited

U.S. PATENT DOCUMENTS 7,388,060 B2 * 6/2008 Wang ...................... C08F 10/00
502/103
9,068,026 B2 * 6/2015 Xia .......................... C08F 10/00
(Continued)

FOREIGN PATENT DOCUMENTS

CN            1020448 C       5/1993
CN       101643519 A  *   2/2010  ............. C08F 4/654
(Continued)

OTHER PUBLICATIONS

CN 101643519 A (Feb. 10, 2010); machine translation. (Year: 2010).*

*Primary Examiner* — Rip A Lee
(74) *Attorney, Agent, or Firm* — NKL Law; Allen Xue

(57) ABSTRACT

A catalyst component for olefin polymerization includes magnesium, titanium, a halogen, an internal electron donor compound, and a precipitation aid. The precipitation aid includes a precipitation aid represented by general formula (I). The precipitation aid represented by general formula (I) includes isomers represented by general formula (I-a) and/or (I-b).

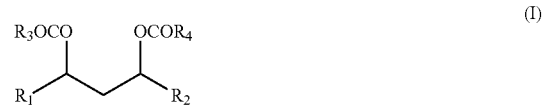

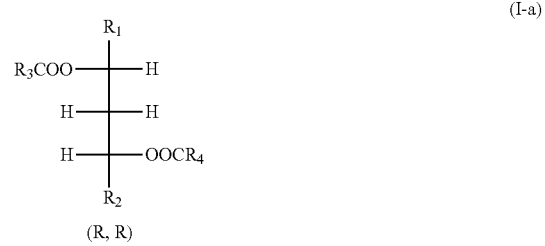

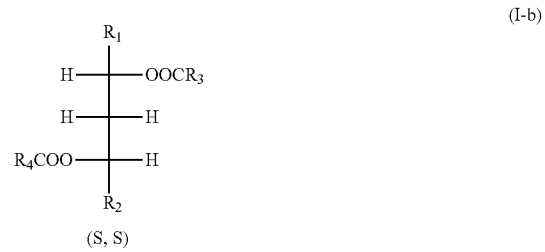

20 Claims, No Drawings

(51) Int. Cl.
*B01J 31/14* (2006.01)
*C08F 2/06* (2006.01)
*C08F 4/614* (2006.01)
*C08F 4/649* (2006.01)
*C08F 6/00* (2006.01)
*C08F 6/02* (2006.01)
*C08F 10/02* (2006.01)
*C08F 110/02* (2006.01)
*C08F 110/06* (2006.01)

(52) U.S. Cl.
CPC ............... *C08F 6/003* (2013.01); *C08F 6/02* (2013.01); *C08F 4/6143* (2013.01); *C08F 4/6494* (2013.01); *C08F 110/02* (2013.01); *C08F 110/06* (2013.01); *C08F 2410/03* (2013.01)

(56) References Cited

U.S. PATENT DOCUMENTS

| | | | | |
|---|---|---|---|---|
| 9,243,086 | B2* | 1/2016 | Li | C08F 10/00 |
| 9,353,197 | B2* | 5/2016 | Xia | C08F 10/00 |
| 9,487,599 | B2* | 11/2016 | Mignogna | C08F 110/06 |
| 9,587,049 | B2* | 3/2017 | Taftaf | C08F 10/00 |
| 9,598,509 | B2* | 3/2017 | Collina | C08F 4/58 |
| 9,598,511 | B2* | 3/2017 | Guidotti | C08F 4/6421 |
| 9,751,960 | B2* | 9/2017 | Li | C08F 10/06 |
| 10,208,135 | B2* | 2/2019 | Guidotti | C08F 4/6455 |
| 2013/0131290 | A1* | 5/2013 | Morini | C08F 4/6494 502/154 |
| 2013/0131293 | A1* | 5/2013 | Mignogna | C08F 10/06 526/135 |
| 2013/0197173 | A1* | 8/2013 | Morini | C08F 10/06 502/127 |

FOREIGN PATENT DOCUMENTS

| | | | | |
|---|---|---|---|---|
| CN | 101864009 A | | 10/2010 | |
| CN | 101906177 A | | 12/2010 | |
| CN | 102039184 A | | 5/2011 | |
| CN | 102234337 A | | 11/2011 | |
| CN | 102276765 A | * | 12/2011 | ............. C08F 10/00 |
| CN | 102311513 A | | 1/2012 | |
| CN | 102372797 A | | 3/2012 | |
| CN | 102603931 A | | 7/2012 | |
| CN | 103012625 A | * | 4/2013 | ............. C08F 10/00 |
| CN | 103012626 A | * | 4/2013 | ............. C08F 10/00 |
| CN | 103012627 A | * | 4/2013 | ............. C08F 10/00 |
| CN | 103012631 A | * | 4/2013 | ............. C08F 10/06 |
| CN | 103012632 A | * | 4/2013 | ............. C08F 10/06 |
| CN | 104204001 A | | 12/2014 | |
| CN | 106317274 A | | 1/2017 | |
| CN | 106317275 A | | 1/2017 | |
| CN | 106608933 A | * | 5/2017 | ............. C08F 10/00 |
| CN | 106608937 A | * | 5/2017 | ............. C08F 10/00 |
| JP | 2001114811 A | | 4/2001 | |
| RU | 2580822 C2 | | 4/2016 | |
| WO | 2005077990 A1 | | 8/2005 | |
| WO | WO 2014/187323 A1 | * | 11/2014 | ............. C08F 10/00 |

* cited by examiner

CATALYST COMPONENT FOR OLEFIN POLYMERIZATION, PREPARATION METHOD THEREOF, AND CATALYST INCLUDING SAME

CROSS REFERENCE OF RELATED APPLICATIONS

The present application is a U.S. national phase entry of international application no. PCT/CN2019/087787, filed on May 21, 2019, which claims the priority and benefit of the Chinese Patent Application Nos. 201810489139.5, 201810489207.8 and 201810489282.4, all filed on May 21, 2018, for which are incorporated herein by reference in their entirety.

FIELD OF THE INVENTION

The present invention belongs to the field of catalysts, and particularly relates to a catalyst component for olefin polymerization, a process for preparing the same and a catalyst comprising the same.

BACKGROUND ART

Solid catalyst components comprising magnesium, titanium, halogen and electron donor as basic ingredients, that is, Ziegler-Natta catalysts well known in the art, can be used for α-olefin polymerization, especially for polymerization of α-olefins having 3 or more carbon atoms, providing higher yields and polymers having higher stereoregularity. One of the methods for preparation thereof includes the following steps: firstly preparing magnesium dichloride into a homogeneous solution, and then carrying out solid precipitation, and supporting a titanium-containing active component. In such a method, in the step of precipitating solids, solids with uniform particle size and good morphology can usually be obtained only when a precipitating auxiliary is present, wherein the precipitating auxiliary is generally an organic acid anhydride, an organic acid, a ketone, an ether, an ester, etc., and it is sometimes considered an internal electron donor compound. See, for example, CN101864009, CN106317274, CN106317275, CN101906177, CN 102276765, CN 103012625, CN 103012626, CN 103012627, and CN 106608933.

It is expected that when a precipitating auxiliary is used in the preparation of the solid catalyst component, the prepared solid catalyst component will contain a certain amount of the precipitating auxiliary, and the precipitating auxiliaryy can affect the performance of solid catalyst component. However, the prior art has paid little attention to the influence of the type of the precipitating auxiliary and its content in the solid catalyst component on the performance of the solid catalyst component.

In addition, various internal electron-donor compounds capable of imparting desired properties to a Ziegler-Natta catalyst are disclosed in the literatures. For example, CN1020448 discloses 1,3-diether-type internal electron donor compounds. Catalyst components comprising the 1,3-diether-type internal electron donor compound has high activity and good hydrogen modulation sensitivity when used for olefin polymerization, and the molecular weight distribution of the resultant olefin polymers is very narrow. As another example, CN102311513 and CN102603931 disclose the use of diethyl 2-cyanosuccinate as an internal electron donor compound. The obtained polyolefin catalyst is insensitive to hydrogen modulation, has good stereospecificity, and the polypropylene obtained by using the catalyst has a very wide molecular weight distribution.

However, the prior art does not teach how to reduce the interference of the precipitating auxiliary on the effect of the internal electron donor compound.

There is still a need in the art for an improved Ziegler-Natta catalyst that exhibits a variety of desirable properties and methods of making the same.

SUMMARY OF INVENTION

In order to address the problems encountered in the prior art, the present inventors have conducted extensive and in-depth studies. As a result, it has now been surprisingly found that when a diol ester, in which the content of specific configuration isomers (i.e., R,R-configuration and/or S,S-configuration isomers) is greater than 80%, is used as an precipitating auxiliary in the preparation of the solid catalyst component, solid particles with good morphology can be precipitated, and the content of residual precipitating auxiliary in the obtained solid catalyst component is extremely low, thereby avoiding the interference of the precipitating auxiliary on the internal electron donor. The present invention has been made on this basis.

Therefore, an object of the present invention is to provide a catalyst component for olefin polymerization, comprising magnesium, titanium, a halogen, an internal electron donor compound and a precipitating auxiliary, wherein the precipitating auxiliary comprises at least one precipitating auxiliary a represented by formula (I), and the precipitating auxiliary a comprises an isomer represented by formula (I-a) and/or formula (I-b):

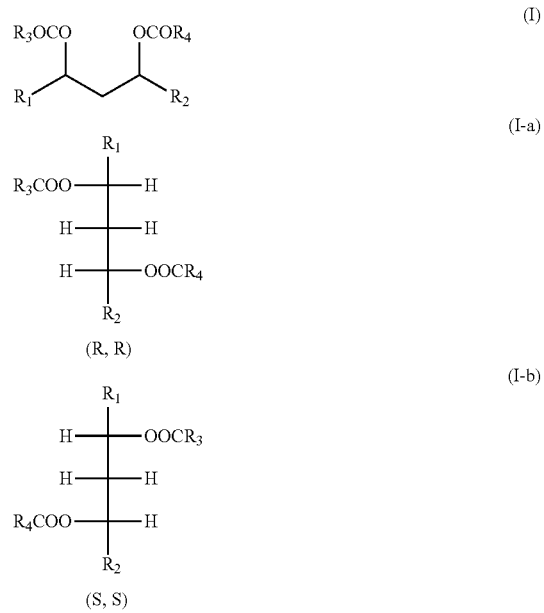

wherein $R_1$ and $R_2$ are each, independently, selected from the group consisting of $C_1$-$C_{10}$ alkyl, $C_3$-$C_{10}$ cycloalkyl, $C_6$-$C_{10}$ aryl and $C_7$-$C_{10}$ aralkyl, either substituted or unsubstituted; $R_3$ and $R_4$ are each, independently, selected from the group consisting of $C_1$-$C_{20}$ alkyl, $C_3$-$C_{20}$ cycloalkyl, $C_6$-$C_{20}$ aryl and $C_7$-$C_{20}$ aralkyl, either substituted or unsubstituted, and wherein the content of the precipitating auxiliary a is lower than 1.0 wt %, based on the total weight of the catalyst component.

A further objective of the present invention is to provide a process for preparing the above-described catalyst component.

A still further objective of the present invention is to provide a catalyst for olefin polymerization, comprising:
1) the catalyst component of the invention;
2) an alkylaluminum compound; and
3) optionally, an external electron donor compound.

A still further objective of the present invention is to provide a pre-polymerized catalyst for olefin polymerization, comprising a prepolymer obtained by conducting a pre-polymerization using the catalyst component/catalyst of the invention and an olefin.

A still further objective of the present invention is to provide a process for the polymerization of an olefin having a formula of $CH_2$=CHR, wherein R is hydrogen, a $C_1$-$C_6$ alkyl or an aryl, comprising polymerizing the olefin in the presence of the catalyst or pre-polymerized catalyst according to the present invention to form a polyolefin polymer; and recovering so-obtained polyolefin polymer.

DETAILED DESCRIPTIONS OF PREFERRED EMBODIMENTS

Definition

As used herein, the term "substituting" or "substituted" means that one or more hydrogen atoms on the group in question is replaced with a halogen atom, a heteroatom, a $C_1$-$C_6$ alkyl or a $C_1$-$C_6$ alkoxy, or a carbon atom in main chain is replaced by a heteroatom.

As used herein, the term "halogen" or "halogen atom" refers to at least one of fluorine, chlorine, bromine and iodine.

As used herein, the term "heteroatom" refers to at least one selected from the group consisting of O, S, N, P, Si and Ge.

The term "polymerization" as used herein intends to include homopolymerization and copolymerization. The term "polymer" as used herein intends to include homopolymer, copolymer and terpolymer.

As used herein, the term "(solid) catalyst component" refers to main catalyst component or procatalyst, which, together with a conventional cocatalyst such as an alkyl aluminum and an optional external electron donor, constitutes a catalyst for olefin polymerization (also referred to as catalyst system in the art).

In a first aspect, the present invention provides a catalyst component for olefin polymerization, comprising magnesium, titanium, a halogen, a precipitating auxiliary, and an internal electron donor compound, wherein the precipitating auxiliary comprises precipitating auxiliary a represented by formula (I), and the precipitating auxiliary a comprises isomers represented by formula (I-a) and/or formula (I-b):

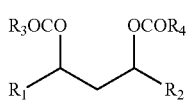
(I)

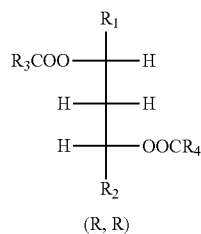
(I-a)

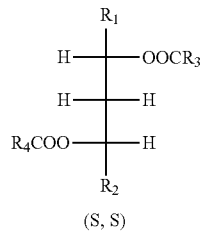
(I-b)

wherein $R_1$ and $R_2$ are each, independently, selected from the group consisting of $C_1$-$C_{10}$ alkyl, $C_3$-$C_{10}$ cycloalkyl, $C_6$-$C_{10}$ aryl and $C_7$-$C_{10}$ aralkyl, either substituted or unsubstituted, preferably from the group consisting of $C_1$-$C_8$ alkyl, $C_3$-$C_8$ cycloalkyl and $C_6$-$C_8$ aryl, either substituted or unsubstituted, more preferably from the group consisting of substituted or unsubstituted $C_1$-$C_4$ alkyl, and still more preferably from the group consisting of methyl, ethyl, n-propyl and iso-propyl; $R_3$ and $R_4$ are each, independently, selected from the group consisting of $C_1$-$C_{20}$ alkyl, $C_3$-$C_{20}$ cycloalkyl, $C_6$-$C_{20}$ aryl and $C_7$-$C_{20}$ aralkyl, either substituted or unsubstituted, preferably from the group consisting of $C_1$-$C_{10}$ alkyl, $C_3$-$C_{10}$ cycloalkyl and $C_6$-$C_{10}$ aryl, either substituted or unsubstituted, more preferably from the group consisting of $C_5$-$C_{10}$ alkyl, $C_5$-$C_{10}$ cycloalkyl, $C_6$-$C_{10}$ aryl and $C_7$-$C_{10}$ aralkyl, either substituted or unsubstituted, and still more preferably from the group consisting of cyclopentyl, cyclohexyl, phenyl, p-methyl phenyl, p-ethyl phenyl, p-n-propyl phenyl, and p-n-butyl phenyl.

The precipitating auxiliary a represented by formula (I) useful in the present invention are esters of diol, which contain two chiral carbon atoms. When $R_1$ and $R_2$ are different from each other and/or $R_3$ and $R_4$ are different from each other, the two chiral carbon atoms are different chiral carbon atoms, and the compounds represented by the formula (I) include four isomers of R,R-configuration, S,S-configuration, R,S-configuration and S,R-configuration shown by formulae (I-a), (I-b), (I-c) and (I-d), respectively. When $R_1$ and $R_2$ are the same and $R_3$ and $R_4$ are the same, the two chiral carbon atoms are identical chiral carbon atoms, R,S-configuration and S,R-configuration become exactly the same configuration, and therefore the compounds represented by formula (I) have three isomers of R,R-configuration, S,S-configuration and R,S-/S,R-configuration shown by formulae (I-a), (I-b) and (I-c), respectively.

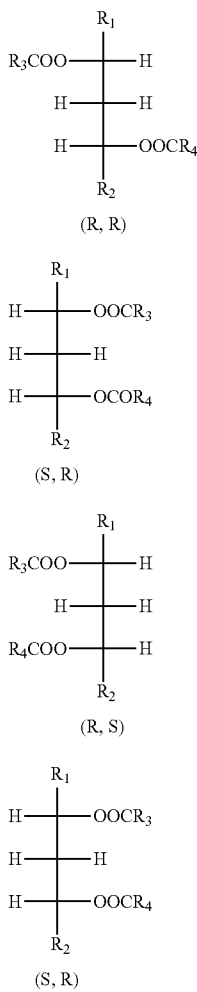

(I-a) (R, R)

(I-b) (S, R)

(I-c) (R, S)

(I-d) (S, R)

In some embodiments, examples of the precipitating auxiliary a represented by the formula (I) include, but are not limited to, 2,4-pentylene dibenzoate, 2,4-pentylene di-p-methylbenzoate, 2,4-pentylene di-p-ethylbenzoate, 2,4-pentylene di-p-n-propylbenzoate, 2,4-pentylene di-p-n-butylbenzoate, 3,5-heptylene dibenzoate, 3,5-heptylene di-p-methylbenzoate, 3,5-heptylene di-p-ethylbenzoate, 3,5-heptylene di-p-n-propylbenzoate, 3,5-heptylene di-p-n-butylbenzoate and mixtures thereof.

According to the present invention, a precipitating auxiliary comprising the precipitating auxiliary a represented by the formula (I) is used in the preparation of the catalyst component. The raw material of the precipitating auxiliary a generally contains (R,R)- and/or (S,S)-isomers in an amount of more than 80 wt %, preferably more than 90 wt %, more preferably more than 95 wt %, and still more preferably more than 98 wt %, based on its total weight. Compared with the (R,S)- and (S,R)-configuration isomers, the (R,R)- and/or (S,S)-configuration isomers have a greatly different binding ability to the catalyst component and are easy to be washed off, and therefore the precipitating auxiliary a retained in the final catalyst component will contain a significantly reduced proportion of (R,R)- and (S,S)-isomers and a significantly increased proportion of (R,S)- and (S,R)-isomers, compared to the raw material of the precipitating auxiliary a. Depending on the composition of the precipitating auxiliary a raw material used in the preparation of the catalyst component, (R,R)- and (S,S)-isomer content and (R,S)- and (S,R)-isomer content of the residual precipitating auxiliary a in the final catalyst component may vary over a wide range. However, it is preferred that a ratio of the (R,R)- and (S,S)-isomer content to the (R,S)- and (S,R)-isomer content of the residual precipitating auxiliary a in the final catalyst component is not less than 1:10, preferably not less than 1:5, more preferably not less than 1:3, and still more preferably not less than 1:2. This can be achieved by selecting a raw material of the precipitating auxiliary a having a high (R,R)- and (S,S)-isomer content.

In some specific embodiments, for the purpose of the present invention, the raw material of the precipitating auxiliary a used in the preparation of the catalyst component comprises, in an amount of more than 80 wt %, preferably more than 90 wt %, more preferably more than 95 wt %, and still more preferably more than 98 wt %, based on its total weight, at least one of the following isomeric combinations: (R,R)-2,4-pentylene dibenzoate and (S,S)-2,4-pentylene dibenzoate, (R,R)-2,4-pentylene di-p-methylbenzoate and (S,S)-2,4-pentylene di-p-methylbenzoate, (R,R)-2,4-pentylene di-p-ethylbenzoate and (S,S)-2,4-pentylene di-p-ethylbenzoate, (R,R)-2,4-pentylene di-p-n-propylbenzoate and (S,S)-2,4-pentylene di-p-n-propylbenzoate, (R,R)-2,4-pentylene di-p-n-butylbenzoate and (S,S)-2,4-pentylene di-p-n-butylbenzoate, (R,R)-3,5-heptylene dibenzoate and (S,S)-3,5-heptylene dibenzoate, (R,R)-3,5-heptylene di-p-methylbenzoate and (S,S)-3,5-heptylene di-p-methylbenzoate, (R,R)-3,5-heptylene di-p-ethylbenzoate and (S,S)-3,5-heptylene di-p-ethylbenzoate, (R,R)-3,5-heptylene di-p-n-propylbenzoate and (S,S)-3,5-heptylene di-p-n-propylbenzoate, (R,R)-3,5-heptylene di-p-n-butylbenzoate and (S,S)-3,5-heptylene di-p-n-butylbenzoate.

Preferably, the raw material of the precipitating auxiliary a used in the preparation of the catalyst component comprises, in an amount of more than 80 wt %, preferably more than 90 wt %, more preferably more than 95 wt %, and still more preferably more than 98 wt %, based on its total weight, at least one of the following isomeric combinations: (R,R)-2,4-pentylene dibenzoate and (S,S)-2,4-pentylene dibenzoate, (R,R)-2,4-pentylene di-p-methylbenzoate and (S,S)-2,4-pentylene di-p-methylbenzoate, (R,R)-2,4-pentylene di-p-ethylbenzoate and (S,S)-2,4-pentylene di-p-ethylbenzoate, (R,R)-2,4-pentylene di-p-n-propylbenzoate and (S,S)-2,4-pentylene di-p-n-propylbenzoate, (R,R)-3,5-heptylene dibenzoate and (S,S)-3,5-heptylene dibenzoate, (R,R)-3,5-heptylene di-p-methylbenzoate and (S,S)-3,5-heptylene di-p-methylbenzoate, (R,R)-3,5-heptylene di-p-ethylbenzoate and (S,S)-3,5-heptylene di-p-ethylbenzoate, (R,R)-3,5-heptylene di-p-n-propylbenzoate and (S,S)-3,5-heptylene di-p-n-propylbenzoate.

Most preferably, the raw material of the precipitating auxiliary a used in the preparation of the catalyst component comprises, in an amount of more than 80 wt %, preferably more than 90 wt %, more preferably more than 95 wt %, and still more preferably more than 98 wt %, based on its total weight, at least one of the following isomeric combinations: (R,R)-2,4-pentylene dibenzoate and (S,S)-2,4-pentylene dibenzoate, (R,R)-2,4-pentylene di-p-methylbenzoate and (S,S)-2,4-pentylene di-p-methylbenzoate, (R,R)-2,4-pentylene di-p-ethylbenzoate and (S,S)-2,4-pentylene di-p-ethylbenzoate, (R,R)-3,5-heptylene dibenzoate and (S,S)-3,5-heptylene dibenzoate, (R,R)-3,5-heptylene di-p-methylbenzoate and (S,S)-3,5-heptylene di-p-methylbenzoate, (R,R)-3,5-heptylene di-p-ethylbenzoate and (S,S)-3,5-heptylene di-p-ethylbenzoate.

In some embodiments of the invention, the content of the precipitating auxiliary a in the catalyst component is lower than 1.0 wt %, preferably lower than 0.5 wt %, more preferably lower than 0.2 wt %, and still more preferably lower than 0.15 wt %, based on the total weight of the catalyst component.

In some embodiments of the invention, the precipitating auxiliary further comprises optionally a precipitating auxiliary b represented by formula (II):

$$Ti(OR_7)_nX_{4-n} \quad (II)$$

wherein $R_7$ is a $C_1$-$C_{10}$ alkyl or a $C_3$-$C_{10}$ cycloalkyl, X is a halogen, and n is 1, 2, 3 or 4.

In some preferred embodiments of the invention, the precipitating auxiliary b is at least one selected from tetramethyl titanate, tetraethyl titanate, tetra-n-butyl titanate, tetra-isobutyl titanate, tetra-n-propyl titanate, and tetra-isopropyl titanate, and preferably is tetraethyl titanate or tetra-n-butyl titanate.

In some embodiments, the precipitating auxiliary in the catalyst component of the invention consists essentially of the above-described precipitating auxiliary a and the above-described precipitating auxiliary b.

In other embodiments, the precipitating auxiliary in the catalyst component of the invention consists essentially of the above-described precipitating auxiliary a.

In some embodiments, the catalyst component of the invention contains no other precipitating auxiliary in addition to the above-described precipitating auxiliary a and the above-described precipitating auxiliary b.

According to the present invention, there is no particular limitation on the internal electron donor in the catalyst component, and any internal electron donor compound known in the art to impart desired properties to the catalyst component may be included in the catalyst component.

In some embodiments, the catalyst component of the invention comprises at least one 2,2-dihydrocarbyl-1,3-propylene glycol dimethyl ether-type compound represented by formula (III) as an internal electron donor:

(III)

wherein $R_5$ and $R_6$ are each, independently, selected from the group consisting of $C_1$-$C_{10}$ alkyl, $C_3$-$C_{10}$ cycloalkyl, $C_6$-$C_{10}$ aryl and $C_7$-$C_{10}$ alkaryl, either substituted or unsubstituted; preferably from the group consisting of $C_1$-$C_8$ alkyl, $C_3$-$C_8$ cycloalkyl and $C_6$-$C_8$ aryl, either substituted or unsubstituted; more preferably from the group consisting of substituted or unsubstituted $C_1$-$C_6$ alkyl groups; and still preferably from the group consisting of methyl, ethyl, n-propyl, iso-propyl, n-butyl, isobutyl, tert-butyl, n-pentyl, iso-pentyl, tert-pentyl, cyclopentyl, cyclohexyl, and phenyl. $R_5$ and $R_6$ are optionally linked to form a ring. Corresponding other ethers such as diethyl ether, dipropyl ether, methyl ethyl ether and the like have also been conceived.

Suitable examples of the 2,2-dihydrocarbyl-1,3-propylene glycol dimethyl ether-type compound represented by the formula (III) includes, but are not limited to, 2,2-di-n-propyl-1,3-propylene glycol dimethyl ether, 2,2-di-iso-propyl-1,3-propylene glycol dimethyl ether, 2,2-di-n-butyl-1,3- propylene glycol dimethyl ether, 2,2-di-isobutyl-1,3-propylene glycol dimethyl ether, 2,2-di-n-pentyl-1,3-propylene glycol dimethyl ether, 2,2-di-iso-pentyl-1,3-propylene glycol dimethyl ether, 2,2-di-n-hexyl-1,3-propylene glycol dimethyl ether, 2,2-di-iso-hexyl-1,3-propylene glycol diether, 2-n-propyl-2-iso-propyl-1,3-propylene glycol dimethyl ether, 2-n-propyl-2-n-butyl-1,3-propylene glycol dimethyl ether, 2-n-propyl-2-isobutyl-1,3-propylene glycol dimethyl ether, 2-n-propyl-2-n-pentyl-1,3-propylene glycol dimethyl ether, 2-n-propyl-2-iso-pentyl-1,3-propylene glycol dimethyl ether, 2-n-propyl-2-n-hexyl-1,3-propylene glycol dimethyl ether, 2-n-propyl-2-iso-hexyl-1,3-propylene glycol dimethyl ether, 2-iso-propyl-2-n-butyl-1,3-propylene glycol dimethyl ether, 2-iso-propyl-2-isobutyl-1,3-propylene glycol dimethyl ether, 2-iso-propyl-2-n-pentyl-1,3-propylene glycol dimethyl ether, 2-iso-propyl-2-iso-pentyl-1,3-propylene glycol dimethyl ether, 2-iso-propyl-2-n-hexyl-1,3-propylene glycol dimethyl ether, 2-iso-propyl-2-iso-hexyl-1,3-propylene glycol dimethyl ether, 2-n-butyl-2-isobutyl-1,3-propylene glycol dimethyl ether, 2-n-butyl-2-n-pentyl-1,3-propylene glycol dimethyl ether, 2-n-butyl-2-iso-pentyl-1,3-propylene glycol dimethyl ether, 2-n-butyl-2-n-hexyl-1,3-propylene glycol dimethyl ether, 2-n-butyl-2-iso-hexyl-1,3-propylene glycol dimethyl ether, 2-isobutyl-2-n-pentyl-1,3-propylene glycol dimethyl ether, 2-isobutyl-2-iso-pentyl-1,3-propylene glycol dimethyl ether, 2-isobutyl-2-n-hexyl-1,3-propylene glycol dimethyl ether, 2-isobutyl-2-iso-hexyl-1,3-propylene glycol dimethyl ether, 2-n-pentyl-2-iso-pentyl-1,3-propylene glycol dimethyl ether, 2-n-pentyl-2-n-hexyl-1,3-propylene glycol dimethyl ether, 2-n-pentyl-2-iso-hexyl-1,3-propylene glycol dimethyl ether, 2-iso-pentyl-2-n-hexyl-1,3-propylene glycol dimethyl ether, 2-iso-pentyl-2-iso-hexyl-1,3-propylene glycol dimethyl ether, and 2-n-hexyl-2-iso-hexyl-1,3-propylene glycol dimethyl ether.

In some preferred embodiments, the catalyst component of the invention comprises, as an internal electron donor, at least one compound selected from the group consisting of 2,2-di-iso-propyl-1,3-propylene glycol dimethyl ether, 2,2-di-n-butyl-1,3-propylene glycol dimethyl ether, 2,2-di-isobutyl-1,3-propylene glycol dimethyl ether, 2,2-di-n-pentyl-1,3-propylene glycol dimethyl ether, 2,2-di-iso-pentyl-1,3-propylene glycol dimethyl ether, 2-n-propyl-2-iso-propyl-1,3-propylene glycol dimethyl ether, 2-n-propyl-2-isobutyl-1,3-propylene glycol dimethyl ether, 2-n-propyl-2-iso-pentyl-1,3-propylene glycol dimethyl ether, 2-iso-propyl-2-n-butyl-1,3-propylene glycol dimethyl ether, 2-iso-propyl-2-isobutyl-1,3-propylene glycol dimethyl ether, 2-iso-propyl-2-n-pentyl-1,3-propylene glycol dimethyl ether, 2-iso-propyl-2-iso-pentyl-1,3-propylene glycol dimethyl ether, 2-iso-propyl-2-iso-hexyl-1,3-propylene glycol dimethyl ether, 2-n-butyl-2-isobutyl-1,3-propylene glycol dimethyl ether, 2-n-butyl-2-iso-pentyl-1,3-propylene glycol dimethyl ether, 2-n-butyl-2-iso-hexyl-1,3-propylene glycol dimethyl ether, 2-isobutyl-2-n-pentyl-1,3-propylene glycol dimethyl ether, 2-isobutyl-2-iso-pentyl-1,3-propylene glycol dimethyl ether, 2-isobutyl-2-n-hexyl-1,3-propylene glycol dimethyl ether, 2-isobutyl-2-iso-hexyl-1,3-propylene glycol dimethyl ether and 2-n-pentyl-2-iso-pentyl-1,3-propylene glycol dimethyl ether.

In some preferred embodiments, the catalyst component of the invention comprises, as an internal electron donor, at least one compound selected from the group consisting of 2,2'-di-iso-propyl-1,3-propylene glycol dimethyl ether, 2,2'-di-isobutyl-1,3-propylene glycol dimethyl ether, 2,2'-di-iso-pentyl-1,3-propylene glycol dimethyl ether, 2-iso-propyl-2-isobutyl-1,3-propylene glycol dimethyl ether, 2-iso-propyl- 2-n-pentyl-1,3-propylene glycol dimethyl ether, 2-iso-propyl-2-iso-pentyl-1,3-propylene glycol dimethyl ether, 2-iso-propyl-2-iso-hexyl-1,3-propylene glycol dimethyl ether, 2-isobutyl-2-n-pentyl-1,3-propylene glycol dimethyl ether, 2-isobutyl-2-iso-pentyl-1,3-propylene glycol dimethyl ether and 2-n-pentyl-2-iso-pentyl-1,3-propylene glycol dimethyl ether.

In some embodiments, the catalyst component of the invention comprises, as an internal electron donor, at least one diethyl 2-cyano-2,3-dihydrocarbylsuccinate-type compound represented by formula (III'):

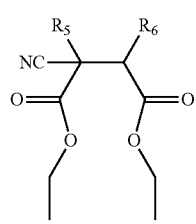

(III)

wherein $R_5$ and $R_6$ are each, independently, selected from the group consisting of $C_1$-$C_{10}$ alkyl, $C_3$-$C_{10}$ cycloalkyl, $C_6$-$C_{10}$ aryl and $C_7$-$C_{10}$ aralkyl, either substituted or unsubstituted; preferably from the group consisting of $C_1$-$C_8$ alkyl, $C_3$-$C_8$ cycloalkyl and $C_6$-$C_8$ aryl, either substituted or unsubstituted; more preferably from the group consisting of $C_1$-$C_6$ alkyl and phenyl, either substituted or unsubstituted; and still more preferably from the group consisting of methyl, ethyl, n-propyl, iso-propyl, n-butyl, isobutyl, tert-butyl, n-pentyl, iso-pentyl, tert-pentyl, cyclopentyl, cyclohexyl, and phenyl. Corresponding other esters such as dimethyl esters, dipropyl esters, methyl ethyl esters and the like have also been conceived.

Suitable examples of the diethyl 2-cyano-2,3-dihydrocarbylsuccinate-type compound represented by the formula (III') include, but are not limited to, diethyl 2-cyano-2,3-di-n-propylsuccinate, diethyl 2-cyano-2,3-di-iso-propylsuccinate, diethyl 2-cyano-2,3-di-n-butylsuccinate, diethyl 2-cyano-2,3-di-isobutylsuccinate, diethyl 2-cyano-2,3-di-n-pentylsuccinate, diethyl 2-cyano-2,3-di-iso-pentylsuccinate, diethyl 2-cyano-2,3-dicyclopentylsuccinate, diethyl 2-cyano-2,3-di-n-hexylsuccinate, diethyl 2-cyano-2,3-di-iso-hexylsuccinate, diethyl 2-cyano-2-iso-propyl-3-n-propylsuccinate, diethyl 2-cyano-2-iso-propyl-3-n-butylsuccinate, diethyl 2-cyano-2-iso-propyl-3-isobutylsuccinate, diethyl 2-cyano-2-iso-propyl-3-n-pentylsuccinate, diethyl 2-cyano-2-iso-propyl-3-iso-pentylsuccinate, diethyl 2-cyano-2-iso-propyl-3-cyclopentylsuccinate, diethyl 2-cyano-2-n-butyl-3-n-propylsuccinate, diethyl 2-cyano-2-n-butyl-3-iso-propylsuccinate, diethyl 2-cyano-2-n-butyl-3-isobutylsuccinate, diethyl 2-cyano-2-n-butyl-3-n-pentylsuccinate, diethyl 2-cyano-2-n-butyl-3-iso-pentylsuccinate, diethyl 2-cyano-2-n-butyl-3-cyclopentylsuccinate, diethyl 2-cyano-2-isobutyl-3-n-propylsuccinate, diethyl 2-cyano-2-isobutyl-3-iso-propylsuccinate, diethyl 2-cyano-2-isobutyl-3-n-butylsuccinate, diethyl 2-cyano-2-isobutyl-3-n-pentylsuccinate, diethyl 2-cyano-2-isobutyl-3-iso-pentylsuccinate, diethyl 2-cyano-2-isobutyl-3-cyclopentylsuccinate, diethyl 2-cyano-2-n-pentyl-3-n-propylsuccinate, diethyl 2-cyano-2-n-pentyl-3-iso-propylsuccinate, diethyl 2-cyano-2-n-pentyl-3-n-butylsuccinate, diethyl 2-cyano-2-n-pentyl-3-isobutylsuccinate, diethyl 2-cyano-2-n-pentyl-3-iso-pentylsuccinate, diethyl 2-cyano-2-n-pentyl-3-cyclopentylsuccinate, diethyl 2-cyano-2-iso-pentyl-3-n-propylsuccinate, diethyl 2-cyano-2-iso-pentyl-3-iso-propylsuccinate, diethyl 2-cyano-2-iso-pentyl-3-n-butylsuccinate, diethyl 2-cyano-2-iso-pentyl-3-isobutylsuccinate, diethyl 2-cyano-2-iso-pentyl-3-n-pentylsuccinate, diethyl 2-cyano-2-iso-pentyl-3-cyclopentylsuccinate, diethyl 2-cyano-2-cyclopentyl-3-n-propylsuccinate, diethyl 2-cyano-2-cyclopentyl-3-iso-propylsuccinate, diethyl 2-cyano-2-cyclopentyl-3-n-butylsuccinate, diethyl 2-cyano-2-cyclopentyl-3-isobutylsuccinate, diethyl 2-cyano-2-cyclopentyl-3-n-pentylsuccinate and diethyl 2-cyano-2-cyclopentyl-3-iso-pentylsuccinate.

In some preferred embodiments, the catalyst component of the invention comprises, as an internal electron donor, at least one compound selected from the group consisting of diethyl 2-cyano-2,3-di-iso-propylsuccinate, diethyl 2-cyano-2,3-di-n-butylsuccinate, diethyl 2-cyano-2,3-di-isobutylsuccinate, diethyl 2-cyano-2,3-di-n-pentylsuccinate, diethyl 2-cyano-2,3-di-iso-pentylsuccinate, diethyl 2-cyano-2-iso-propyl-3-n-propylsuccinate, diethyl 2-cyano-2-iso-propyl-3-n-butylsuccinate, diethyl 2-cyano-2-iso-propyl-3-isobutylsuccinate, diethyl 2-cyano-2-iso-propyl-3-n-pentylsuccinate, diethyl 2-cyano-2-iso-propyl-3-iso-pentylsuccinate, diethyl 2-cyano-2-iso-propyl-3-cyclopentylsuccinate, diethyl 2-cyano-2-n-butyl-3-iso-propylsuccinate, diethyl 2-cyano-2-n-butyl-3-isobutylsuccinate, diethyl 2-cyano-2-n-butyl-3-n-pentylsuccinate, diethyl 2-cyano-2-isobutyl-3-iso-propylsuccinate, diethyl 2-cyano-2-isobutyl-3-n-butylsuccinate, diethyl 2-cyano-2-isobutyl-3-n-pentylsuccinate, diethyl 2-cyano-2-n-pentyl-3-iso-propylsuccinate, diethyl 2-cyano-2-n-pentyl-3-n-butylsuccinate, diethyl 2-cyano-2-n-pentyl-3-isobutylsuccinate, diethyl 2-cyano-2-iso-pentyl-3-iso-propylsuccinate, diethyl 2-cyano-2-iso-pentyl-3-n-butylsuccinate, diethyl 2-cyano-2-iso-pentyl-3-isobutylsuccinate, diethyl 2-cyano-2-cyclopentyl-3-iso-propylsuccinate, diethyl 2-cyano-2-cyclopentyl-3-n-butylsuccinate and diethyl 2-cyano-2-cyclopentyl-3-isobutylsuccinate.

In some preferred embodiments, the catalyst component of the invention comprises, as an internal electron donor, at least one compound selected from the group consisting of diethyl 2-cyano-2,3-di-iso-propylsuccinate, diethyl 2-cyano-2,3-di-n-butylsuccinate, diethyl 2-cyano-2,3-di-isobutylsuccinate, diethyl 2-cyano-2,3-di-n-pentylsuccinate, diethyl 2-cyano-2,3-di-iso-pentylsuccinate, diethyl 2-cyano-2-iso-propyl-3-n-butylsuccinate, diethyl 2-cyano-2-iso-propyl-3-isobutylsuccinate, diethyl 2-cyano-2-iso-propyl-3-n-pentylsuccinate, diethyl 2-cyano-2-iso-propyl-3-iso-pentylsuccinate, diethyl 2-cyano-2-iso-propyl-3-cyclopentylsuccinate, diethyl 2-cyano-2-n-butyl-3-iso-propylsuccinate, diethyl 2-cyano-2-isobutyl-3-iso-propylsuccinate, diethyl 2-cyano-2-n-pentyl-3-iso-propylsuccinate, diethyl 2-cyano-2-iso-pentyl-3-iso-propylsuccinate and diethyl 2-cyano-2-cyclopentyl-3-iso-propylsuccinate.

In some embodiments, the catalyst component of the invention comprises, as an internal electron donor, at least one phthalate-type compound represented by formula (III"):

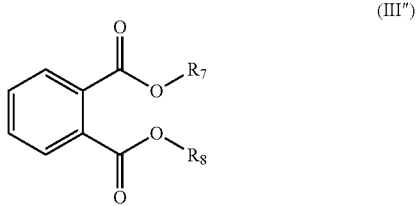

(III")

wherein $R_7$ and $R_8$ are each, independently, selected from the group consisting of $C_1$-$C_{10}$ alkyl, $C_3$-$C_{10}$ cycloalkyl, $C_6$-$C_{10}$ aryl and $C_7$-$C_{10}$ alkaryl, either substituted or unsubstituted; preferably from the group consisting of $C_1$-$C_8$ alkyl, $C_3$-$C_8$ cycloalkyl and $C_6$-$C_8$ aryl, either substituted or unsubstituted; more preferably from the group consisting of substituted or unsubstituted $C_1$-$C_6$ alkyl groups; and still more preferably from the group consisting of methyl, ethyl, n-propyl, iso-propyl, n-butyl, isobutyl, n-pentyl and iso-pentyl.

Suitable examples of the phthalate-type compound represented by the formula (III") include, but are not limited to, dimethyl phthalate, diethyl phthalate, di-n-propyl phthalate, diisopropyl phthalate, di-n-butyl phthalate, diisobutyl phthalate, di-n-pentyl phthalate and diisoamyl phthalate.

Preferably, the phthalate-type compound represented by the formula (III") is selected from the group consisting of diethyl phthalate, di-n-propyl phthalate, diisopropyl phthalate, di-n-butyl phthalate, di-isobutyl phthalate, and di-n-pentyl phthalate. Most preferably, the phthalate-type compound represented by the formula (III") is selected from the group consisting of diethyl phthalate, di-isopropyl phthalate, di-n-butyl phthalate and di-isobutyl phthalate.

In the catalyst component of the invention, the content of titanium ranges from 1.0 wt % to 8.0 wt %, and preferably from 1.6 wt % to 6.0 wt %; the content of magnesium ranges from 10.0 wt % to 70.0 wt %, and preferably from 15.0 wt % to 40.0 wt %; the content of halogen ranges from 20.0 wt % to 90.0 wt %, and preferably from 30.0 wt % to 85.0 wt %; the content of the internal electron donor compound ranges from 2.0 wt % to 30.0 wt %, and preferably from 3.0 wt % to 20.0 wt %, based on the total weight of the catalyst component.

In some embodiments, the catalyst component of the invention comprises a reaction product of a magnesium compound, a titanium compound, at least one internal electron donor compound, and a precipitating auxiliary at least comprising at least one precipitating auxiliary a represented by the formula (I). Titanium compounds, magnesium compounds and internal electron donor compounds that can be used to prepare Ziegler-Natta catalyst components by a dissolution-precipitation method are well known to those skilled in the art, and they can be used in conventional amounts employed in the art to form the catalyst component of the present invention. Some examples of the titanium compounds and the magnesium compounds will be described hereinbelow.

In some embodiments of the invention, relative to one mole of the magnesium compound, the amount of the precipitating auxiliary a used may range from 0.005 to 0.3 moles, and preferably from 0.01 to 0.05 moles; a molar ratio of the precipitating auxiliary a to the internal electron donor compound may range from 0.05:1 to less than 0.8:1, and preferably from 0.1: 1 to 0.7:1.

In some embodiments of the invention, the precipitating auxiliary used in the preparation of the catalyst component further comprises the above-described precipitating auxiliary b, and the amount of the precipitating auxiliary b used ranges from 0.01 to 5 moles, and preferably from 0.5 to 3 moles, relative to one mole of the precipitating auxiliary a.

In a second aspect, the present invention provides a method for preparing the catalyst component for olefin polymerization according to the present invention. In principle, any method known in the art that can be used to prepare a Ziegler-Natta catalyst by a dissolution-precipitation process can be used to prepare the catalyst components of the present invention, provided that a precipitating auxiliary comprising the precipitating auxiliary a as described above is introduced into the reaction system before the precipitation of solid particles.

Therefore, the present invention provides a method for preparing the catalyst component for olefin polymerization, comprising the steps of:
1) dissolving a magnesium compound in a solvent system to form a magnesium compound-containing solution;
2) precipitating particulate magnesium-containing solids from the magnesium compound-containing solution in the presence of a precipitating auxiliary, wherein the precipitating auxiliary comprises at least one precipitating auxiliary a represented by formula (I);

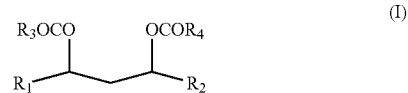

(I)

wherein $R_1$ and $R_2$ are each, independently, selected from the group consisting of $C_1$-$C_{10}$ alkyl, $C_3$-$C_{10}$ cycloalkyl, $C_6$-$C_{10}$ aryl or $C_7$-$C_{10}$ aralkyl, either substituted or unsubstituted; $R_3$ and $R_4$ are each, independently, selected from the group consisting of $C_1$-$C_{20}$ alkyl, $C_3$-$C_{20}$ cycloalkyl, $C_6$-$C_{20}$ aryl or $C_7$-$C_{20}$ aralkyl, either substituted or unsubstituted;

wherein the precipitating auxiliary a represented by formula (I) comprises isomers represented by formula (I-a) and/or formula (I-b) in an amount of more than 80 wt %, preferably more than 90 wt %, more preferably more than 95 wt %, and still more preferably more than 98 wt %, based on the total weight of the precipitating auxiliary a represented by formula (I); and

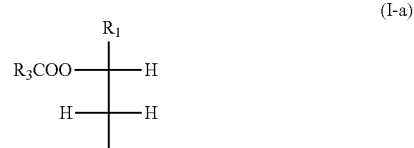

(I-a)

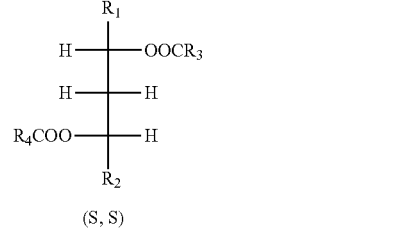

(I-b)

3) supporting a titanium-based active component on the particulate magnesium-containing solids to form a solid catalyst component.

A first exemplary method that can be used to prepare the catalyst component for olefin polymerization of the present invention includes the following steps:

(1) reacting a magnesium compound with an alcohol compound, optionally in the presence of an inert hydrocarbon solvent, to obtain a uniform magnesium compound-alcohol adduct solution;

(2) reacting the magnesium compound-alcohol adduct solution from step (1) with a first titanium compound in the presence of a precipitating auxiliary, to obtain a solid precipitate-containing mixture, wherein the precipitating auxiliary comprises at least one precipitating auxiliary a represented by formula (I);

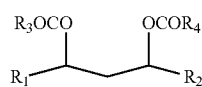
(I)

wherein $R_1$ and $R_2$ are each, independently, selected from the group consisting of $C_1$-$C_{10}$ alkyl, $C_3$-$C_{10}$ cycloalkyl, $C_6$-$C_{10}$ aryl and $C_7$-$C_{10}$ aralkyl, either substituted or unsubstituted; $R_3$ and $R_4$ are each, independently, selected from the group consisting of $C_1$-$C_{20}$ alkyl, $C_3$-$C_{20}$ cycloalkyl, $C_6$-$C_{20}$ aryl and $C_7$-$C_{20}$ aralkyl, either substituted or unsubstituted;

wherein the precipitating auxiliary a represented by the formula (I) comprises isomers represented by formula (I-a) and/or formula (I-b) in an amount of more than 80 wt %, preferably more than 90 wt %, more preferably more than 95 wt %, and still more preferably more than 98 wt %, based on the total weight of the precipitating auxiliary a represented by the formula (I);

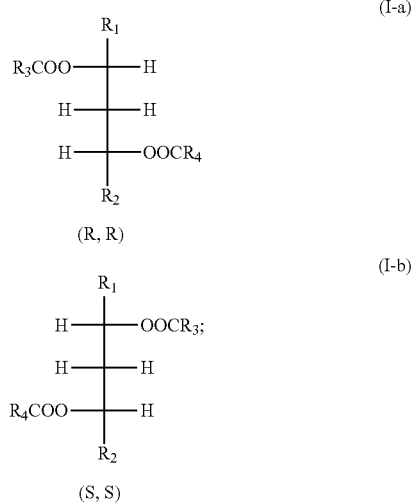

(3) contacting the mixture from step (2) with a first internal electron donor compound, to obtain a suspension;

(4) subjecting the suspension from step (3) to solid-liquid separation to obtain a first solid intermediate product, and contacting the obtained first solid intermediate product with a second titanium compound and optionally a second internal electron donor compound to provide a mixture;

(5) subjecting the mixture from step (4) to solid-liquid separation, to obtain a second solid intermediate product, and treating the second solid intermediate product with a third titanium compound to form a solid catalyst component; and (6) recovering the solid catalyst component.

The first, second and third titanium compounds used in the first method may be the same or different, and the first and second internal electron donors may be the same or different.

In a specific embodiment, the first method includes the following steps: (1) conducting a first contacting reaction of a magnesium compound and an alcohol compound in an inert hydrocarbon solvent, to obtain a uniform magnesium compound-alcohol adduct solution; (2) conducting a second contacting reaction of the uniform solution from step (1) and a first titanium compound in the presence of a precipitating auxiliary, to obtain a solid precipitate-containing mixture; (3) conducting a third contacting reaction of the mixture from step (2) and a first internal electron donor compound, to obtain a suspension; (4) subjecting the suspension from step (3) to solid-liquid separation, conducting a fourth contacting reaction of the resulting solid intermediate product with a second titanium compound and a second internal electron donor compound, and then conducting solid-liquid separation, to obtain a solid intermediate product; (5) conducting a fifth contacting reaction of the solid intermediate product from step (4) with a third titanium compound, followed by solid-liquid separation, and subjecting the resulting solid product to washing with an inert solvent and drying, to obtain the final solid catalyst component.

The alcohol compound used in the first method may be one or more selected from $C_1$-$C_{10}$ linear or branched aliphatic alcohol, $C_3$-$C_{12}$ alicyclic alcohol, $C_6$-$C_{20}$ aryl alcohol and $C_7$-$C_{20}$ aralkyl alcohol. Examples of the alcohol compound include, but are not limited to, ethanol, n-propanol, iso-propanol, n-butanol, isobutanol, 2-butanol, n-pentanol, isopentanol, n-hexanol, iso-hexanol, 2-ethylhexanol, benzyl alcohol, phenethanol, cyclopentanol, methylcyclopentanol, cyclohexanol and mixtures thereof, preferably 2-ethylhexanol.

In the first method, relative to one mole of magnesium, the amount of the alcohol compound used ranges from 2 to 4 moles, and preferably from 2.5 to 3.5 moles, and the total amount of the titanium compounds used in steps (2), (4) and (5) ranges from 1 to 40 moles, and preferably from 1.5 to 35 moles.

The process conditions employed in the first method include: in step (1), temperature for reaction/first contacting reaction ranges from 30 to 150° C., and preferably from 60 to 140° C., and reaction time ranges from 0.5 to 10 hours, and preferably from 0.5 to 6 hours; in step (2), temperature for reaction/second contacting reaction ranges from −40° C. to 0° C., and preferably from −30° C. to −20° C., and reaction time ranges from 3 to 5 hours, and preferably from 3.5 to 4.5 hours; in step (3), temperature for reaction/third contacting reaction ranges from 20 to 120° C., and preferably from 70 to 110° C., and reaction time ranges from 0.5 to 6 hours, and preferably from 1 to 4 hours; in step (4), temperature for reaction/fourth contacting reaction ranges from 50 to 150° C., and preferably from 80 to 120° C., and reaction time ranges from 1 to 6 hours, and preferably from 2.5 to 4.5 hours; in step (5), temperature for treating/fifth contacting reaction ranges from 50 to 150° C., and preferably from 80 to 120° C., and time ranges from 1 to 6 hours, and preferably from 2.5 to 4.5 hours.

More details of the above method can be found in CN 106317275, the entire disclosure of which is incorporated herein by reference.

A second exemplary method that can be used to prepare the catalyst component for olefin polymerization of the present invention includes the following steps:

(1) contacting a magnesium compound with an organic epoxy compound and an organic phosphorus compound, optionally in the presence of an inert hydrocarbon solvent, to form a uniform magnesium compound solution;

(2) reacting the magnesium compound solution from step (1) with a first titanium compound and a first internal electron donor compound in the presence of a precipitating auxiliary, to obtain a solid precipitate-containing suspension, wherein the precipitating auxiliary comprises at least one precipitating auxiliary a represented by formula (I):

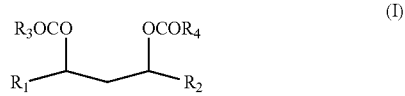

wherein $R_1$ and $R_2$ are each, independently, selected from the group consisting of $C_1$-$C_{10}$ alkyl, $C_3$-$C_{10}$ cycloalkyl, $C_6$-$C_{10}$ aryl and $C_7$-$C_{10}$ aralkyl, either substituted or unsubstituted; $R_3$ and $R_4$ are each, independently, selected from the group consisting of $C_1$-$C_{20}$ alkyl, $C_3$-$C_{20}$ cycloalkyl, $C_6$-$C_{20}$ aryl and $C_7$-$C_{20}$ aralkyl, either substituted or unsubstituted;

wherein the precipitating auxiliary a represented by formula (I) comprises isomers represented by formula (I-a) and/or formula (I-b) in an amount of more than 80 wt %, preferably more than 90 wt %, more preferably more than 95 wt %, and still more preferably more than 98 wt %, based on the total weight of the precipitating auxiliary a represented by formula (I);

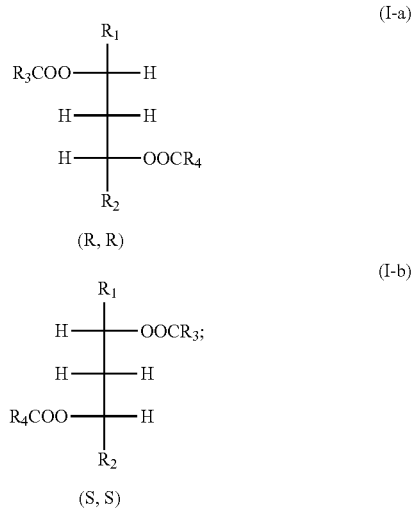

(3) subjecting the suspension from step (2) to solid-liquid separation to obtain a first solid intermediate product, and contacting the first solid intermediate product with a second titanium compound and optionally a second internal electron donor compound to provide a mixture;

(4) subjecting the mixture from step (3) to solid-liquid separation to obtain a second solid intermediate product;

(5) treating the second solid intermediate product with a third titanium compound 1-4 times, to form a solid catalyst component; and (6) recovering the solid catalyst component.

The first, second, and third titanium compounds used in the second method may be the same or different, and the first and second internal electron donors may be the same or different.

In a specific embodiment, the second method includes the following steps: (1) conducting a first contacting reaction of a magnesium compound with an organic epoxy compound and an organic phosphorus compound in an inert hydrocarbon solvent, to obtain a uniform magnesium compound solution; (2) conducting a second contacting reaction of the uniform solution from step (1) with a first titanium compound and a first internal electron donor compound in the presence of a precipitating auxiliary, to obtain a solid precipitates-containing suspension; (3) subjecting the solid precipitates-containing suspension from step (2) to solid-liquid separation to obtain a solid intermediate product A, and conducting a third contacting reaction of the solid intermediate product A with a second titanium compound and a second internal electron donor compound, followed by solid-liquid separation, to obtain a solid intermediate product B; (4) conducting a fourth contacting reaction of the solid intermediate product B from step (3) with a third titanium compound, followed by solid-liquid separation, to obtain a solid intermediate product C; treating the solid intermediate product C with the third titanium compound 1-3 times, followed by solid-liquid separation, and subjecting the resulting solid product to washing with an inert solvent and drying, to obtain the final solid catalyst component.

The organic epoxy compound used in the second method may be at least one selected from epoxy ethane, epoxy propane, epoxy butane, vinyl epoxy ethane, butadiene dioxide, epoxy chloropropane, methyl glycidyl ether and diglycidyl ether, and preferably is epoxy chloropropane.

The organic phosphorus compound used in the second method may be at least one selected from hydrocarbyl- or halogenated hydrocarbyl-esters of phosphoric or phosphorous acid, preferably at least one selected from trimethyl phosphate, triethyl phosphate, tributyl phosphate, triphenyl phosphate, trimethyl phosphite, triethyl phosphite, tributyl phosphite, and benzyl phosphite, and more preferably is tributyl phosphate.

In the second method, relative to one mole of magnesium, the amount of the organic epoxy compound used ranges from 0.2 to 10 moles, and preferably from 0.5 to 4.0 moles; the amount of the organic phosphorus compound used ranges from 0.1 to 3.0 moles, and preferably from 0.3 to 1.5 moles; and the total amount of the titanium compounds used ranges from 3 to 40 moles, and preferably from 5 to 35 moles.

Process conditions employed in the second method include: in step (1), temperature for the reaction/first contacting reaction ranges from 0 to 80° C., and preferably from 10 to 60° C., and reaction time ranges from 0.5 to 10 hours, and preferably from 0.5 to 6 hours; in step (2), temperature for the reaction/second contacting reaction ranges from −40° C. to 0° C., and preferably from −30° C. to −20° C., and reaction time ranges from 3 to 5 hours, and preferably from 3.5 to 4.5 hours; in step (3), temperature for the reaction/third contacting reaction ranges from 50 to 150° C., and preferably from 80 to 120° C., and reaction time ranges from 1 to 6 hours, and preferably from 2.5 to 4.5 hours; in step (5), temperature for the treating/fourth contacting reaction ranges from 50 to 150° C., and preferably from 80 to 120° C., and time ranges from 1 to 6 hours, an preferably from 2.5 to 4.5 hours.

More details of the above method can be found in CN 101864009, the entire disclosure of which is incorporated herein by reference.

Any internal electron donor compound known in the art that can impart desired properties to the polyolefin catalyst component can be used in the methods of the present invention as the internal electron donor or the first and/or second internal electron donor. In some embodiments, the methods of the present invention utilize at least one compound represented by formula (III), formula (III') or formula (III") described above as the first and/or second internal electron donor. The first and second internal electron donors may be the same or different.

In the above first and second preparation methods, the molar ratio of the first internal electron donor compound to the second internal electron donor compound may be (0.1-10): 1, preferably (0.2-5): 1, and more preferably (0.2-1): 1.

Examples of the magnesium compound that can be used in the above-mentioned first and second preparation methods include one or more of compounds represented by formula (IV), hydrates represented by formula (V), and alcohol adducts represented by formula (VI):

$$MgR_8R_9 \quad (IV)$$

$$MgR_8R_9 \cdot qH_2O \quad (V)$$

$$MgR_8R_9 \cdot PR_0OH \quad (VI)$$

wherein $R_8$ and $R_9$ are each, independently, selected from the group consisting of halogen, $C_1$-$C_5$ hydrocarbyl, $C_1$-$C_5$ hydrocarbyloxy, $C_1$-$C_5$ halohydrocarbyl and $C_1$-$C_5$ halohydrocarbyloxy; preferably $R_8$ and $R_9$ are each, independently, fluorine, chlorine, bromine or iodine, preferably chlorine or bromine, wherein in the formula (V), q is from 0.1 to 6.0, and preferably from 2.0 to 3.5;

wherein in the formula (VI), $R_0$ is a $C_1$-$C_{18}$ hydrocarbyl, preferably a $C_1$-$C_8$ alkyl; and p is from 0.1 to 6.0, and preferably from 2.0 to 3.5.

In some preferred embodiments of the invention, the magnesium compound is at least one selected from magnesium dichloride, magnesium dibromide, phenoxy magnesium chloride, isopropoxy magnesium chloride, and butoxy magnesium chloride.

In some more preferred embodiments of the invention, the magnesium compound is anhydrous magnesium dichloride.

The inert hydrocarbon solvent may be any hydrocarbon solvent commonly used in the art that does not chemically interact with the magnesium compound, such as at least one of alkanes, cycloalkanes and aromatic hydrocarbons, preferably at least one of decane, benzene, toluene and xylenes, and more preferably toluene.

The titanium compound useful in the methods of the present invention includes at least one compound represented by formula (VII):

$$TiX_m(OR_{10})_{4-m} \quad (VII)$$

wherein $R_{10}$ is a $C_1$-$C_{20}$ hydrocarbyl, preferably a $C_1$-$C_5$ alkyl; X is chlorine, bromine, or iodine; and m is 1, 2, 3 or 4.

In some preferred embodiments of the invention, the titanium compound is at least one selected from titanium tetrachloride, titanium tetrabromide, titanium tetraiodide, tetraalkoxytitanium, alkoxytitanium trihalide, dialkoxytitanium dihalide and trialkoxytitanium halide.

In some more preferred embodiments of the invention, the titanium compound is titanium tetrachloride.

In a third aspect, the present invention provides a catalyst for olefin polymerization, comprising:
1) the catalyst component as described in the first aspect of the present invention;
2) an alkylaluminum compound; and
3) optionally, an external electron donor compound.

Preferably, a molar ratio of the component 1) to the component 2), in terms of titanium:aluminum, is (5-5000):1, preferably (20-1000):1, and more preferably (50-500):1.

The alkylaluminum compound of the component 2) may be one or more of various alkylaluminum compounds that can be used as a co-catalyst of Ziegler-Natta type catalysts commonly used in the field of olefin polymerization.

In some preferred embodiments of the invention, the alkylaluminum compound of the component 2) includes at least one compound represented by formula (VIII):

$$AlR'_nX'_{3-n'} \quad (VIII)$$

wherein R' is selected from H, $C_1$-$C_{20}$ alkyl and $C_6$-$C_{20}$ aryl, X' is a halogen, and $1 \le n' \le 3$.

In some more preferred embodiments of the invention, the alkylaluminum compound is at least one selected from trimethylaluminum, triethylaluminum, triisobutylaluminum, tri-n-hexylaluminum, tri-n-octylaluminum, monohydrogen diethylaluminum, monohydrogen diisobutylaluminum, diethylaluminum chloride, diisobutylaluminum chloride, sesquiethylaluminum chloride, and ethylaluminum dichloride.

According to the present invention, there is not a particular limitation on the kind and amount of the external electron donor compound. The external electron donor compound may be one or more of various compounds commonly used in the field of olefin polymerization that can be used as an external electron donor compound in Ziegler-Natta type catalysts. If used, the external electron donor compound is used in an amount commonly employed in the art.

In some preferred embodiments of the invention, a molar ratio of the component 3) to the component 2), in terms of silicon:aluminum, is 1:(0.1-500), preferably 1:(1-300), and more preferably 1:(3-100).

In some preferred embodiments of the invention, the external electron donor compound includes at least one compound represented by formula (IX):

$$R^{1''}{}_{m''}R^{2''}{}_{n''}Si(OR^{3''})_{4-m''-n''} \quad (IX)$$

wherein $R^{1''}$ and $R^{2''}$ are each, independently, selected from H, halogen, $C_1$-$C_{20}$ alkyl or haloalkyl, $C_3$-$C_{20}$ cycloalkyl and $C_6$-$C_{20}$ aryl; $R^{3''}$ is selected from $C_1$-$C_{20}$ alkyl or haloalkyl, $C_3$-$C_{20}$ cycloalkyl and $C_6$-$C_{20}$ aryl; m" and n" are independently an integer from 0 to 3, and m"+n"<4.

In some more preferred embodiments of the invention, the external electron donor compound is at least one selected from trimethyl methoxy silane, trimethyl ethoxy silane, trimethyl phenoxy triethyl methoxy silane, triethyl ethoxy silane, dimethyl dimethoxy silane, dimethyl diethoxy silane, ethyl iso-propyl dimethoxy silane, propyl iso-propyl dimethoxy silane, di-iso-propyl dimethoxy silane, di-isobutyl dimethoxy silane, iso-propyl isobutyl dimethoxy silane, di-tert-butyl dimethoxy silane, tert-butyl methyl dimethoxy silane, tert-butyl ethyl dimethoxy silane, tert-butyl propyl dimethoxy silane, tert-butyl iso-propyl dimethoxy silane, tert-butyl butyl dimethoxy silane, tert-butyl isobutyl dimethoxy silane, tert-butyl sec-butyl dimethoxy silane, tert-butyl pentyl dimethoxy silane, tert-butyl nonyl dimethoxy silane, tert-butyl hexyl dimethoxy silane, tert-butyl heptyl dimethoxy silane, tert-butyl octyl dimethoxy silane, tert-butyl decyl dimethoxy silane, methyl tert-butyl dimethoxy silane, cyclohexyl methyl dimethoxy silane, cyclohexyl ethyl dimethoxy silane, cyclohexyl propyl dimethoxy silane, cyclohexyl isobutyl dimethoxy silane, di-cyclohexyl dimethoxy silane, cyclohexyl tert-butyl dimethoxy silane, cyclopentyl methyl dimethoxy silane, cyclopentyl ethyl dimethoxy silane, cyclopentyl propyl dimethoxy silane, cyclopentyl tert-butyl dimethoxy silane, dicyclopentyl dimethoxy silane, cyclopentyl cyclohexyl dimethoxy silane, di(2-methylcyclopentyl) dimethoxy silane, diphenyl dimethoxy silane, diphenyl diethoxy silane, phenyl triethoxy silane, methyl trimethoxy silane, methyl triethoxy silane, ethyl trimethoxy silane, ethyl triethoxy silane, propyl trimethoxy silane, iso-propyl trimethoxy silane, butyl trimethoxy silane, butyl triethoxy silane, isobutyl trimethoxy silane, tert-butyl trimethoxy silane, sec-butyl trimethoxy silane, pentyl trimethoxy silane, iso-pentyl trimethoxy silane, cyclopentyl trimethoxy silane, cyclohexyl trimethoxy silane, diphenyl dimethoxy silane, diphenyl diethoxy silane, phenyl trimethoxy silane, phenyl triethoxy silane, n-propyl trimethoxy silane, vinyl trimethoxy silane, tetramethoxy silane, tetraethoxy silane, tetrabutoxy silane, 2-ethylpiperidyl-2-tert-butyl dimethoxy silane, 1,1,1-trifluoro-2-propyl 2-ethylpiperidyl dimethoxy silane and 1,1,1-trifluoro-2-propyl methyl dimethoxy silane.

In some further preferred embodiments of the present invention, the external electron donor compound is at least one selected from dicyclopentyl dimethoxy silane, di-isopropyl dimethoxy silane, di-isobutyl dimethoxy silane, cyclohexyl methyl dimethoxysilane, methyl tert-butyl dimethoxy silane and tetramethoxy silane.

In a fourth aspect, the present invention provides a pre-polymerized catalyst for olefin polymerization, comprising a prepolymer obtained by conducting a pre-polymerization using the catalyst component as described in the first aspect of the present invention or the catalyst as described in the third aspect of the present invention and an olefin, wherein the prepolymer has a prepolymerization multiple of from 5 to 1000 g of polyolefin/g of catalyst component, preferably from 10 to 500 g of polyolefin/g of catalyst component. Preferably, the olefin used in the pre-polymerization is ethylene or propylene.

In some embodiments of the invention, pre-polymerization temperature is from −20 to 80° C., and preferably from 10 to 50° C.

In a fifth aspect, the present invention provides an olefin polymerization process, wherein the olefin is polymerized under the action of the catalyst component as described in the first aspect of the present invention, the catalyst as described in the third aspect of the present invention or the pre-polymerized catalyst as described in the fourth aspect of the present invention. The olefin is of formula $CH_2=CHR$, wherein R is hydrogen, a $C_1$-$C_6$ alkyl or phenyl.

The olefin polymerization process provided by the present invention may be used for olefin homopolymerization, and also for copolymerization of multiple olefins. The olefin is at least one selected from ethylene, propylene, 1-butene, 1-pentene, 1-hexene, 1-octene and 4-methyl-1-pentene. Preferably, the olefin may be at least one of ethylene, propylene, 1-butene, 4-methyl-1-pentene and 1-hexene. Preferably, the olefin is propylene.

In the preparation of polyolefins, the components of the catalyst according to the present invention, that is, the catalyst component provided by the present invention, the alkyl aluminum compound as a cocatalyst, and the optional external electron donor compound, may contact with each other before their contacting with the olefin monomer (this is called "pre-contacting" or "pre-complexing" in the industry), and it is also possible that the three components are separately added to the polymerization reactor to conduct polymerization reaction, that is, no "pre-contacting" is carried out. In the olefin polymerization process provided by the present invention, it is preferred to perform "pre-contacting" of the components of the olefin polymerization catalyst. The "pre-contacting" time is 0.1-30 min, and preferably 1-10 minutes; and the "pre-contacting" temperature is −20° C. to 80° C., and preferably 10 to 50° C.

In some embodiments, the catalyst of the present invention is firstly pre-polymerized to a certain degree in the presence of a small amount of olefin monomer to obtain a pre-polymerized catalyst, and then the pre-polymerized catalyst is further contacted with the olefin monomer to obtain an olefin polymer. This technology is called "pre-polymerization" process in the industry, and it helps to improve the polymerization activity of the catalyst and increase the polymer bulk density. In the olefin polymerization method provided by the present invention, the "pre-polymerization" process may or may not be used. Preferably, the "pre-polymerization" process is used.

In the olefin polymerization method of the present invention, the polymerization conditions may be conventional conditions in the art.

Without being bound by any particular theory, it is believed that the precipitating auxiliary a as used in the present invention, that is, the diol ester having a content of the specific optical configuration isomers (R,R-configuration and/or S,S-configuration isomers) of greater than 80% can be more easily removed from the solid catalyst component, compared with conventional corresponding diol ester industrial products (usually having a content of R,R-configuration and/or S,S-configuration isomers of about 40%). Therefore, the content of residual precipitating auxiliary in the solid catalyst component prepared according to the method of the present invention is relatively low, thereby not interfering the function of the internal electron donor component.

Moreover, the inventors have found that the precipitating auxiliary a, that is, the diol ester having a content of specific optical configuration isomers (R,R-configuration and/or S,S-configuration isomers) of more than 80%, can work well, so that the particle shape of the obtained catalyst component is better.

EXAMPLES

To make the present invention easier to be understood, the present invention will be described in detail with reference to examples, which are only for illustrative purposes and do not limit the scope of the present invention.

The test methods used in the present invention are as follows:
(1) Purity and diastereoisomeric ratio of the precipitating auxiliary a, diol ester compound: determined using the Acquity UPLC Ultra High Performance Liquid Chromatograph of Waters Company, USA.
(2) Configuration of the precipitating auxiliary compound: determined using a Brukerdmx nuclear magnetic resonance instrument (300 MHz, solvent CDCl$_3$, internal standard TMS, and measurement temperature 300K).

(3) Content of diol ester compound in the catalyst component: determined using the Acquity UPLC Ultra High Performance Liquid Chromatograph of Waters Company, USA.

(4) Polymer Melt Index (MI): determined according to GB/T3682-2000.

(5) Isotacticity index (II) of propylene polymer: determined by heptane extraction method: 2 g of a dry polymer sample is extracted with boiling heptane in an extractor for 6 hours, then the residual substance is dried to constant weight, and the ratio of the weight of the residual polymer (g) to 2 (g) is regarded as isotacticity index.

(6) Activity (Ac) calculation: catalyst activity=(mass of polyolefin produced)/(mass of catalyst solid component) (kg/g).

(7) Bulk density (BD) measurement: The prepared polymer powder was dropped freely from a funnel from a height of 10 cm into a 100 mL container, and the polymer powder in the container was weighed (Mg), then the polymer bulk density was M/100 g/cm$^3$.

(8) Polymer molecular weight distribution, MWD (MWD=Mw/Mn): Measured at 150° C. using PL-GPC220 with trichlorobenzene as a solvent (standard sample: polystyrene, flow rate: 1.0 mL/min, columns: 3×Plgel 10 um MIXED-B 300×7.5 nm).

In the present invention, an ultra high performance liquid chromatograph is used, and separation conditions of liquid chromatography are adjusted so that the diol esters of R,R-configuration and S,S-configuration and the diol esters of R,S-configuration have different retention times. Thus, R,R- and S,S-configuration diol esters are distinguished from R,S-configuration diol esters. The specific separation conditions are:

(1) Column: ACQUITY UPLC BEH Shield RP18 (100 mm×2.1 mm, 1.7 μm);
(2) Column temperature: 35° C.;
(3) Mobile phase: 75% methanol, 25% ultrapure water;
(4) Flow rate: 0.3 mL/min;
(5) PDA detection wavelength: 229 nm.

Under these conditions, the retention times of the diol esters in R,R- and S,S-configurations are the same and relatively short, and the retention times of the diol esters in R,S-configuration are relatively long. At the same time, the configuration of the diastereomers can be determined based on the 1H NMR signal peaks.

Preparation Example

Synthesis processes of the precipitating auxiliary a represented by formula (I), ester-of-diol-type compounds, as employed in examples are as follows.

Compound 1: 2,4-pentylene dibenzoate (R,R-configuration+S,S-configuration): R,S-configuration=99.1:0.16

(1) Preparation of a mixture of R,R-2,4-pentylene glycol and S,S-2,4-pentylene glycol 500 g of 2,4-pentylene glycol were added to 1200 mL of anhydrous diethyl ether, stirred well, cooled to −50° C., and maintained for 1 to 1.5 hours. The reaction mixture was quickly filtered to collect precipitated solids, and so-obtained solids were further recrystallized with diethyl ether at −20° C. trice, to afford the target product (184.4 g, with a purity of 99.4% (GC)).

$^1$H NMR (CDCl$_3$/TMS, 300 MHz) δ (ppm): 1.202-1.258 (m, 6H, —CH(OH)CH$_3$), 1.536-1.632 (m, 2H, —CH$_2$CH (OH)CH$_3$), 4.048-4.211 (m, 2H, rac-CH(OH)CH$_3$).

(2) Synthesis of 2,4-pentylene dibenzoate 259.3 g of benzoyl chloride were added to 500 mL of toluene to afford benzoyl chloride solution. 80 g of the mixture of R,R-2,4-pentylene glycol and S,S-2,4-pentylene glycol prepared above, 152.3 g of anhydrous pyridine and 4.0 g of 4-dimethylaminopyridine were added to 100 mL toluene and, after the solids were completely dissolved, the resultant solution was added dropwise into the benzoyl chloride solution, and the temperature was kept below 50° C. Upon the completion of the dropwise addition, the temperature was raised to 80° C. for 4 hours, then the temperature was further increased to reflux for 8 hours. Upon the completion of the reaction, the reaction mixture was cooled to room temperature, filtered, and a portion of toluene was removed via rotary evaporation from the filtrate, and the remaining filtrate was vigorously stirred and washed to pH=12 with an equal amount of 10% sodium carbonate solution. Liquid separation was conducted, and the organic phase was washed with a saturated ammonium chloride solution to pH=6-7. After separation, the organic phase was dried over anhydrous magnesium sulfate, filtered, rotary dried to remove solvent, and distilled under reduced pressure to afford a crude product. The crude product was recrystallized using n-hexane at −20° C. to afford the target product (142.7 g, having a purity of 99.26% (LC)), in which the content of R,R-configuration and S,S-configuration isomers is 99.1%, and diastereoisomeric ratio of (R,R-configuration+S,S-configuration):R,S-configuration is 99.1:0.16.

$^1$H NMR (CDCl$_3$/TMS, 300 MHz) δ (ppm): 1.397-1.418 (d, 6H, —CH(OCO)CH$_3$), 2.074-2.116 (m, 2H, —CH$_2$CH (OCO)CH$_3$), 5.287-5.350 (m, 2H, —CH$_2$CH(OCO)CH$_3$), 7.253-7.987 (m, 5H, —C$_6$H$_5$).

Compound 2: 3,5-heptylene dibenzoate (R,R-configuration+S,S-configuration): R, S-configuration=96.3:1.0

(1) Preparation of a mixture of R,R-3,5-heptylene glycol and S,S-3,5-heptylene glycol A mixture of R,R-3,5-heptylene glycol and S,S-3,5-heptylene glycol (181.3 g, having a purity of 99.6% (GC)) was prepared by using a process similar to step (1) in the synthesis of compound 1, but 2,4-pentylene glycol was replaced with 3,5-heptylene glycol.

$^1$H NMR (CDCl$_3$/TMS, 300 MHz) δ (ppm): 0.923-0.972 (m, 6H, —CH(OH)CH$_2$CH$_3$), 1.476-1.589 (m, 4H, —CH$_2$CH(OH)CH$_2$CH$_3$), 1.607-1.627 (m, 2H, —CH$_2$CH (OH)CH$_2$CH$_3$), 3.815-3.909 (m, 2H, rac-CH(OH)CH$_3$).

(2) Synthesis of 3,5-heptylene dibenzoate 3,5-heptylene dibenzoate (142.7 g, having a purity of 97.3% (LC)) was synthesized by using a process similar to step (2) in the synthesis of compound 1, but the mixture of R, R-2,4-pentylene glycol and S,S-2,4-pentylene glycol was replaced with the above-prepared mixture of R,R-3,5-heptylene glycol and S,S-3,5-heptylene glycol. The 3,5-heptylene dibenzoate has a content of R,R-configuration and S,S-configuration isomers of 96.3%, and a diastereoisomeric ratio of (R,R-configuration+S,S-configuration):R, S-configuration of 96.3:1.0.

1H NMR (CDCl$_3$/TMS, 300 MHz) δ (ppm): 0.933-0.983 (d, 6H, —CH(OCO)CH$_2$CH$_3$), 1.737-1.785 (m, 4H, —CH$_2$CH(OCO)CH$_2$CH$_3$), 2.062-2.103 (m, 2H, —CH$_2$ (OCO)CH$_2$CH$_3$), 5.194-5.275 (m, 2H, —CH$_2$CH(OCO) CH$_2$CH$_3$), 7.243-7.981 (m, 5H, —C$_6$H$_5$).

Compound 3: 2,4-pentylene dibenzoate (R,R-configuration+S,S-configuration):R,S-configuration=37:60

This compound was commercially obtained and used as received. This compound has a content of R,R-configuration and S,S-configuration isomers of 37%, and a diastereoisomeric ratio of (R,R-configuration+S,S-configuration):R,S-configuration of 37:60.

Compound 4: 3,5-heptylene dibenzoate (R,R-configuration+S,S-configuration):R,S-configuration=35:61

This compound was commercially obtained and used as received. This compound has a content of R,R-configuration and S,S-configuration isomers of 35%, and a diastereoisomeric ratio of (R,R-configuration+S,S-configuration):R,S-configuration of 35:61.

Example 1

I. Preparation of catalyst component
(1) Preparation of magnesium dichloride-alcohol adduct solution: To a reactor, in which air had been repeatedly replaced with high-purity nitrogen, were charged successively 1400 mL of isooctanol, 1400 mL of toluene and 350 g of anhydrous magnesium dichloride. The contents were allowed to react under conditions of stirring speed of 1300 rpm and temperature of 115° C. for 3.5 hours to completely dissolve the solids to form a uniform magnesium dichloride-alcohol adduct solution. 52.5 mL of tetrabutyl titanate was added thereto, and the contents were allowed to react under conditions of stirring speed of 1300 rpm and temperature of 110° C. for 1.5 hours. Then, 1960 mL of toluene was added, and the temperature was kept constant for half an hour. Then, 140 mL of toluene and 45 g of Compound 1 were added, and the mixture was allowed to react under conditions of stirring speed of 1300 rpm and temperature of 50° C. for 0.5 hours, and then cooled to room temperature to form a magnesium dichloride-alcohol adduct solution containing a precipitating auxiliary.
(2) Preparation of catalyst component: The above-prepared precipitating auxiliary-containing magnesium dichloride-alcohol adduct solution was added dropwise over 3 hours to a reactor, in which air had been well replaced with nitrogen, containing 4200 mL of titanium tetrachloride and 2800 mL of toluene. Upon the completion of the dropwise addition, the contents were stirred at −25° C. to fully react for 0.5 hours, and then heated to 110° C. over 6 hours. 35 g of 2-iso-propyl-2-iso-pentyl-1,3-propylene glycol dimethyl ether and 100 mL of toluene were added thereto, and the temperature was maintained at 110° C. for 2 hours. Then, the liquid was filtered off to afford a solid intermediate product. 6300 mL of toluene and 700 mL of titanium tetrachloride were added to the solid intermediate product, and the mixture was stirred at 80° C. for 1 hour, cooled to room temperature and filtered under pressure. To so-obtained solid intermediate product were added with 6300 mL of toluene and 700 mL of titanium tetrachloride, the mixture was heated to 80° C., and 112 g of 2-iso-propyl-2-iso-pentyl-1,3-propylene glycol dimethyl ether and 100 mL of toluene were added thereto. After maintaining at that temperature for 1 hour, the liquid was filtered off. To so-obtained solid intermediate product were added with 5600 mL of toluene and 1400 mL of titanium tetrachloride, the mixture was heated to 110° C. and stirred for 1 hour, and then the liquid was filtered off. So-obtained solid product was washed 4 times with 6000 mL of hexane and dried to afford olefin polymerization catalyst component 1.

II. Propylene polymerization

The above-prepared catalyst component 1 was used in propylene polymerization as follows: in a 5 L autoclave, after full replacement with gas-phase propylene, 5 mL of a triethylaluminum solution in hexane (having a triethylaluminum concentration of 0.5 mmol/mL), 1 mL of cyclohexylmethyldimethoxysilane (CHMMS) solution in hexane (having a CHMMS concentration of 0.10 mmol/mL), 10 mL of anhydrous hexane, and 10 mg of solid catalyst component 1 were added at room temperature. Polymerizations were performed under two set of conditions: (1) 4.5 standard liters of hydrogen gas and 2 L of liquid propylene, 70° C., polymerization time of 1 hour, and after the stirring was stopped, un-polymerized propylene monomer being removed and resultant polymer being collected; (2) 1.0 standard liters of hydrogen gas and 2 L of liquid propylene, 70° C., polymerization time of 2 hours, and after the stirring was stopped, un-polymerized propylene monomer being removed and resultant polymer being collected. The polymerization results are shown in Table 1 below.

Example 2

Catalyst component 2 was prepared by following the preparation procedure described in Example 1, except that in step (1), the compound 1 was replaced with compound 2.

Propylene polymerization was conducted by following the procedure described in Example 1, except that the catalyst component 1 was replaced with the catalyst component 2. Polymerization results are shown in Table 1.

Example 3

I. Preparation of catalyst component
(1) Preparation of magnesium dichloride solution: To a reactor, in which air had been repeatedly replaced with high-purity nitrogen, were charged successively 350 g of anhydrous magnesium dichloride, 4667 mL of toluene, 576 mL of epichlorohydrin, and 649 mL of tributyl phosphate at room temperature. The contents were heated to 55° C. at a stirring speed of 1300 rpm and allowed to react for 3.0 hours to completely dissolve the solids, to form a uniform magnesium chloride solution.
(2) Preparation of catalyst component: The magnesium dichloride solution was cooled to −28° C., and 4100 mL of titanium tetrachloride, 290 mL of toluene, 58 g of Compound 1, and 36 g of 2-isopropyl-2-isopentyl-1,3-propanediol dimethyl ether were added dropwise thereto. Upon the completion of the dropwise addition, the reaction mixture was stirred at −28° C. to fully react for 1.0 hour, and then heated to 80° C. over 4.5 hours. After maintaining at that temperature for 1.5 hours, the liquid was removed by pressure filtration, and the residues were washed twice with 8750 ml of toluene for each time. 51 g of 2-isopropyl-2-isopentyl-1,3-propanediol dimethyl ether and 6560 mL of toluene were added, and the temperature was maintained at 80° C. for 1 hour. Then, 4375 ml of titanium tetrachloride was added, and the mixture was heated up to 110° C. and stirred for 1 hour. The liquid was removed by pressure filtration, and 4200 mL of toluene and 2800 mL of titanium tetrachloride were added. The mixture was stirred for 1 hour, and the liquid was removed by pressure filtration. Next, 4200 mL of toluene and 2800 mL of titanium tetrachloride were added, and the mixture was stirred for 1 hour. After removing the liquid by pressure filtration, the obtained solids were washed 5 times with 6000 mL of hexane and dried, to obtain olefin polymerization catalyst component 3.

II. Propylene polymerization

The above-prepared catalyst component 3 was used in propylene polymerization as follows: in a 5 L autoclave, after full replacement with gas-phase propylene, 5 mL of a triethylaluminum solution in hexane (having a triethylaluminum concentration of 0.5 mmol/mL), 1 mL of cyclohexylmethyldimethoxysilane (CHMMS) solution in hexane (having a CHMMS concentration of 0.10 mmol/mL), 10 mL of anhydrous hexane, and 10 mg of solid catalyst component 3 were added at room temperature. Polymerizations were performed under two set of conditions: (1) 4.5 standard liters of hydrogen gas and 2 L of liquid propylene, 70° C., polymerization time of 1 hour, and after the stirring was stopped, un-polymerized propylene monomer being removed and resultant polymer being collected; (2) 1.0 standard liters of hydrogen gas and 2 L of liquid propylene, 70° C., polymerization time of 2 hours, and after the stirring was stopped, un-polymerized propylene monomer being removed and resultant polymer being collected. The polymerization results are shown in Table 1 below.

Example 4

Catalyst component 4 was prepared by following the preparation procedure described in Example 3, except that in step (1), the compound 1 was replaced with compound 2.

Propylene polymerization was conducted by following the procedure described in Example 3, except that the catalyst component 3 was replaced with the catalyst component 4. Polymerization results are shown in Table 1.

Comparative Example 1

Catalyst component C1 was prepared by following the preparation procedure described in Example 1, except that in step (1), the compound 1 was replaced with compound 3.

Propylene polymerization was conducted by following the procedure described in Example 1, except that the catalyst component 1 was replaced with the catalyst component C1. Polymerization results are shown in Table 1.

Comparative Example 2

Catalyst component C2 was prepared by following the preparation procedure described in Example 1, except that in step (1), the compound 1 was replaced with compound 4.

Propylene polymerization was conducted by following the procedure described in Example 1, except that the catalyst component 1 was replaced with the catalyst component C2. Polymerization results are shown in Table 1.

Comparative Example 3

Catalyst component C3 was prepared by following the preparation procedure described in Example 3, except that in step (1), the compound 1 was replaced with compound 3.

Propylene polymerization was conducted by following the procedure described in Example 3, except that the catalyst component 3 was replaced with the catalyst component C3. Polymerization results are shown in Table 1.

Comparative Example 4

Catalyst component C4 was prepared by following the preparation procedure described in Example 3, except that in step (1), the compound 1 was replaced with compound 4.

Propylene polymerization was conducted by following the procedure described in Example 3, except that the catalyst component 3 was replaced with the catalyst component C4. Polymerization results are shown in Table 1.

TABLE 1

| Catalyst | Content of diol ester wt % | A:B* | Polymerization conditions | Activity kgPP/gcat | BD g/$cm^3$ | MI g/10 min | II % | MWD |
|---|---|---|---|---|---|---|---|---|
| Example 1 | 0.16 | 0.08:0.09 | 4.5 L/1 h | 72.7 | 0.42 | 41.3 | 97.9 | 4.5 |
|  |  |  | 1.0 L/2 h | 84.7 | 0.42 | 2.84 | 99.8 |  |
| Example 2 | 0.11 | 0.04:0.06 | 4.5 L/1 h | 74.6 | 0.44 | 44.6 | 98.0 | 4.6 |
|  |  |  | 1.0 L/2 h | 88.3 | 0.47 | 3.29 | 99.3 |  |
| Example 3 | 0.17 |  | 4.5 L/1 h | 72.0 | 0.43 | 32.9 | 97.8 | 4.7 |
|  |  |  | 1.0 L/2 h | 85.1 | 0.43 | 3.16 | 99.3 |  |
| Example 4 | 0.14 |  | 4.5 L/1 h | 74.7 | 0.43 | 38.1 | 97.9 | 4.6 |
|  |  |  | 1.0 L/2 h | 86.1 | 0.44 | 2.76 | 99.2 |  |
| Comp. Example 1 | 4.10 | 0.10:4.00 | 4.5 L/1 h | 70.5 | 0.42 | 46.6 | 97.8 | 6.9 |
|  |  |  | 1.0 L/2 h | 78.3 | 0.42 | 3.14 | 99.2 |  |
| Comp. Example 2 | 3.81 | 0.08:3.73 | 4.5 L/1 h | 71.6 | 0.43 | 42.7 | 97.8 | 6.7 |
|  |  |  | 1.0 L/2 h | 82.7 | 0.44 | 2.99 | 99.0 |  |
| Comp. Example 3 | 4.61 |  | 4.5 L/1 h | 70.6 | 0.44 | 31.4 | 97.2 | 6.8 |
|  |  |  | 1.0 L/2 h | 79.1 | 0.44 | 2.96 | 98.9 |  |
| Comp. Example 4 | 4.19 |  | 4.5 L/1 h | 71.1 | 0.43 | 35.9 | 97.4 | 6.6 |
|  |  |  | 1.0 L/2 h | 80.3 | 0.43 | 2.61 | 99.0 |  |

*A:B = (R,R-configuration + S,S-configuration):(R,S-configuration)

It can be seen from the data in Table 1 that when the diol ester compounds of the R, R- and S, S-configuration are used as an precipitating auxiliary in the preparation of the catalyst component, the content of the diol ester as the precipitating auxiliary in the obtained catalyst component is extremely low, but the catalyst component still maintains high activity and stereotactic ability and the prepared polypropylene has a narrow molecular weight distribution. Good particle morphology of the polypropylene powder has been observed, indicating that the particle morphology of the catalyst component is good.

Example 5

I. Preparation of catalyst component
(1) Preparation of magnesium dichloride-alcohol adduct solution: To a reactor, in which air had been repeatedly replaced with high-purity nitrogen, were charged successively 1400 mL of isooctanol, 1400 mL of toluene and 350 g of anhydrous magnesium dichloride. The contents were allowed to react under conditions of stirring speed of 1300 rpm and temperature of 115° C. for 3.5 hours to completely dissolve the solids to form a uniform magnesium dichloride-alcohol adduct solution. 52.5 mL of tetrabutyl titanate was added, and the contents were allowed to react under conditions of stirring speed of 1300 rpm and temperature of 110° C. for 1.5 hours. Then, 1960 mL of toluene was added, and the temperature was kept constant for half an hour. Then, 140 mL of toluene and 45 g of Compound 1 were added, and the mixture was allowed to react under conditions of stirring speed of 1300 rpm and temperature of 50° C. for 0.5 hours, and then cooled to room temperature to form a magnesium dichloride-alcohol adduct solution containing a precipitating auxiliary.
(2) Preparation of catalyst component: The above-prepared precipitating auxiliary-containing magnesium dichloride-alcohol adduct solution was added dropwise over 3 hours to a reactor, in which air had been well replaced with nitrogen, containing 4200 mL of titanium tetrachloride and 2800 mL of toluene. Upon the completion of the dropwise addition, the reaction mixture was stirred at −25° C. to fully react for 0.5 hours, and then heated to 110° C. over 6 hours. 35 g of diethyl 2-cyano-2,3-di-iso-propylsuccinate and 100 mL of toluene were added thereto, and the temperature was maintained at 110° C. for 2 hours. Then, the liquid was filtered off to afford a solid intermediate product. 6300 mL of toluene and 700 mL of titanium tetrachloride were added to the solid intermediate product, and the mixture was stirred at 80° C. for 1 hour, cooled to room temperature and filtered under pressure. To so-obtained solid intermediate product were added with 6300 mL of toluene and 700 mL of titanium tetrachloride, the mixture was heated to 80° C., and 112 g of diethyl 2-cyano-2,3-di-iso-propylsuccinate and 100 mL of toluene were added thereto. After maintaining at that temperature for 1 hour, the liquid was filtered off. To so-obtained solid intermediate product were added with 5600 mL of toluene and 1400 ml of titanium tetrachloride, the mixture was heated to 110° C. and stirred for 1 hour, and then the liquid was filtered off. So-obtained solid product was washed 4 times with 6000 mL of hexane and dried to afford olefin polymerization catalyst component 5.

II. Propylene polymerization
The above-prepared catalyst component 5 was used in propylene polymerization as follows: in a 5 L autoclave, after full replacement with gas-phase propylene, 5 mL of a triethylaluminum solution in hexane (having a triethylaluminum concentration of 0.5 mmol/mL), 1 mL of cyclohexylmethyldimethoxysilane (CHMMS) solution in hexane (having a CHMMS concentration of 0.10 mmol/mL), 10 mL of anhydrous hexane, and 10 mg of solid catalyst component 5 were added at room temperature. Polymerizations were performed under two set of conditions: (1) 4.5 standard liters of hydrogen gas and 2 L of liquid propylene, 70° C., polymerization time of 1 hour, and after the stirring was stopped, un-polymerized propylene monomer being removed and resultant polymer being collected; (2) 1.0 standard liters of hydrogen gas and 2 L of liquid propylene, 70° C., polymerization time of 2 hours, and after the stirring was stopped, un-polymerized propylene monomer being removed and resultant polymer being collected. The polymerization results are shown in Table 2 below.

Example 6

Catalyst component 6 was prepared by following the preparation procedure described in Example 5, except that in step (2), the 35 g of diethyl 2-cyano-2,3-di-iso-propylsuccinate was replaced with 35 g of di-n-butyl phthalate (DNBP).
Propylene polymerization was conducted by following the procedure described in Example 5, except that the catalyst component 5 was replaced with the catalyst component 6. Polymerization results are shown in Table 2.

Example 7

Catalyst component 7 was prepared by following the preparation procedure described in Example 5, except that in step (1), Compound 1 was replaced with Compound 2.
Propylene polymerization was conducted by following the procedure described in Example 5, except that the catalyst component 5 was replaced with the catalyst component 7. Polymerization results are shown in Table 2.

Example 8

Catalyst component 8 was prepared by following the preparation procedure described in Example 5, except that in step (1), Compound 1 was replaced with Compound 2, and in step (2), the 35 g of diethyl 2-cyano-2,3-di-iso-propylsuccinate was replaced with 35 g of di-n-butyl phthalate (DNBP).
Propylene polymerization was conducted by following the procedure described in Example 5, except that the catalyst component 5 was replaced with the catalyst component 8. Polymerization results are shown in Table 2.

Example 9

I. Preparation of catalyst component
(1) Preparation of magnesium dichloride solution: To a reactor, in which air had been repeatedly replaced with high-purity nitrogen, were charged successively 350 g of anhydrous magnesium dichloride, 4667 mL of toluene, 576 mL of epichlorohydrin, and 649 mL of tributyl phosphate at room temperature. The contents were heated to 55° C. at a stirring speed of 1300 rpm and allowed to react for 3.0 hours to completely dissolve the solids, to form a uniform magnesium chloride solution.

(2) Preparation of catalyst component: The magnesium dichloride solution was cooled to −28° C., and 4100 mL of titanium tetrachloride, 290 mL of toluene, 58 g of Compound 1, and 36 g of diethyl 2-cyano-2,3-di-iso-propylsuccinate were added dropwise thereto. Upon the completion of the dropwise addition, the reaction mixture was stirred at −28° C. to fully react for 1.0 hour, and then heated to 80° C. over 4.5 hours. After maintaining at that temperature for 1.5 hours, the liquid was removed by pressure filtration, and the residual solids were washed twice with 8750 mL of toluene for each time. 51 g of diethyl 2-cyano-2,3-di-iso-propylsuccinate and 6560 mL of toluene were added, and the temperature was maintained at 80° C. for 1 hour. Then, 4375 ml of titanium tetrachloride was added, and the mixture was heated up to 110° C. and stirred for 1 hour. The liquid was removed by pressure filtration, and 4200 mL of toluene and 2800 mL of titanium tetrachloride were added. The mixture was stirred for 1 hour, and the liquid was removed by pressure filtration. Next, 4200 mL of toluene and 2800 mL of titanium tetrachloride were added, and the mixture was stirred for 1 hour. After removing the liquid by pressure filtration, the obtained solids were washed 5 times with 6000 mL of hexane and dried, to obtain olefin polymerization catalyst component 9.

II. Propylene polymerization

The above-prepared catalyst component 9 was used in propylene polymerization as follows: in a 5 L autoclave, after full replacement with gas-phase propylene, 5 mL of a triethylaluminum solution in hexane (having a triethylaluminum concentration of 0.5 mmol/mL), 1 mL of cyclohexylmethyldimethoxysilane (CHMMS) solution in hexane (having a CHMMS concentration of 0.10 mmol/mL), 10 mL of anhydrous hexane, and 10 mg of solid catalyst component 9 were added at room temperature. Polymerizations were performed under two set of conditions: (1) 4.5 standard liters of hydrogen gas and 2 L of liquid propylene, 70° C., polymerization time of 1 hour, and after the stirring was stopped, un-polymerized propylene monomer being removed and resultant polymer being collected; (2) 1.0 standard liters of hydrogen gas and 2 L of liquid propylene, 70° C., polymerization time of 2 hours, and after the stirring was stopped, un-polymerized propylene monomer being removed and resultant polymer being collected. The polymerization results are shown in Table 2 below.

Example 10

Catalyst component 10 was prepared by following the preparation procedure described in Example 9, except that in step (2), the 36 g of diethyl 2-cyano-2,3-di-iso-propylsuccinate was replaced with 36 g of di-n-butyl phthalate (DNBP).

Propylene polymerization was conducted by following the procedure described in Example 9, except that the catalyst component 9 was replaced with the catalyst component 10. Polymerization results are shown in Table 2.

Example 11

Catalyst component 11 was prepared by following the preparation procedure described in Example 9, except that in step (1), Compound 1 was replaced with Compound 2.

Propylene polymerization was conducted by following the procedure described in Example 9, except that the catalyst component 9 was replaced with the catalyst component 11. Polymerization results are shown in Table 2.

Example 12

Catalyst component 12 was prepared by following the preparation procedure described in Example 9, except that in step (1), Compound 1 was replaced with Compound 2, and in step (2), the 36 g of diethyl 2-cyano-2,3-di-iso-propylsuccinate was replaced with 36 g of di-n-butyl phthalate (DNBP).

Propylene polymerization was conducted by following the procedure described in Example 9, except that the catalyst component 9 was replaced with the catalyst component 12. Polymerization results are shown in Table 2.

Comparative Example 5

Catalyst component C5 was prepared by following the preparation procedure described in Example 5, except that in step (1), Compound 1 was replaced with Compound 3.

Propylene polymerization was conducted by following the procedure described in Example 5, except that the catalyst component 5 was replaced with the catalyst component C5. Polymerization results are shown in Table 2.

Comparative Example 6

Catalyst component C6 was prepared by following the preparation procedure described in Example 6, except that in step (1), Compound 1 was replaced with Compound 3.

Propylene polymerization was conducted by following the procedure described in Example 6, except that the catalyst component 6 was replaced with the catalyst component C6. Polymerization results are shown in Table 2.

Comparative Example 7

Catalyst component C7 was prepared by following the preparation procedure described in Example 7, except that in step (1), Compound 1 was replaced with Compound 4.

Propylene polymerization was conducted by following the procedure described in Example 7, except that the catalyst component 7 was replaced with the catalyst component C7. Polymerization results are shown in Table 2.

Comparative Example 8

Catalyst component C8 was prepared by following the preparation procedure described in Example 8, except that in step (1), Compound 1 was replaced with Compound 4.

Propylene polymerization was conducted by following the procedure described in Example 8, except that the catalyst component 8 was replaced with the catalyst component C8. Polymerization results are shown in Table 2.

Comparative Example 9

Catalyst component C9 was prepared by following the preparation procedure described in Example 9, except that in step (1), Compound 1 was replaced with Compound 3.

Propylene polymerization was conducted by following the procedure described in Example 9, except that the catalyst component 9 was replaced with the catalyst component C9. Polymerization results are shown in Table 2.

Comparative Example 10

Catalyst component C10 was prepared by following the preparation procedure described in Example 10, except that in step (1), Compound 1 was replaced with Compound 3.

Propylene polymerization was conducted by following the procedure described in Example 10, except that the catalyst component 10 was replaced with the catalyst component C10. Polymerization results are shown in Table 2.

Comparative Example 11

Catalyst component C11 was prepared by following the preparation procedure described in Example 11, except that in step (1), Compound 1 was replaced with Compound 4.

Propylene polymerization was conducted by following the procedure described in Example 11, except that the catalyst component 11 was replaced with the catalyst component C11. Polymerization results are shown in Table 2.

Comparative Example 12

Catalyst component C12 was prepared by following the preparation procedure described in Example 12, except that in step (1), Compound 1 was replaced with Compound 4.

Propylene polymerization was conducted by following the procedure described in Example 12, except that the catalyst component 12 was replaced with the catalyst component C12. Polymerization results are shown in Table 2.

TABLE 2

| Catalyst | Content of diol ester, wt % | A:B* | Polymerization conditions | Activity kgPP/gcat | BD g/cm$^3$ | MI g/10 min | II % | MWD |
|---|---|---|---|---|---|---|---|---|
| Example 5 | 0.17 | 0.08:0.09 | 4.5 L/1 h | 63.9 | 0.42 | 7.40 | 96.6 | 12.8 |
|  |  |  | 1.0 L/2 h | 72.8 | 0.42 | 0.94 | 97.6 |  |
| Example 6 | 0.18 |  | 4.5 L/1 h | 71.4 | 0.42 | 9.06 | 96.7 | 11.9 |
|  |  |  | 1.0 L/2 h | 80.8 | 0.42 | 1.98 | 97.4 |  |
| Example 7 | 0.17 | 0.08:0.09 | 4.5 L/1 h | 67.2 | 0.42 | 7.20 | 96.8 | 12.5 |
|  |  |  | 1.0 L/2 h | 76.4 | 0.42 | 0.92 | 97.7 |  |
| Example 8 | 0.10 |  | 4.5 L/1 h | 74.3 | 0.42 | 8.89 | 97.0 | 11.8 |
|  |  |  | 1.0 L/2 h | 82.8 | 0.42 | 1.36 | 97.8 |  |
| Example 9 | 0.18 | 0.06:0.12 | 4.5 L/1 h | 62.8 | 0.43 | 8.20 | 97.4 | 12.7 |
|  |  |  | 1.0 L/2 h | 76.2 | 0.43 | 0.98 | 98.1 |  |
| Example 10 | 0.15 |  | 4.5 L/1 h | 66.4 | 0.43 | 9.52 | 97.4 | 11.6 |
|  |  |  | 1.0 L/2 h | 79.2 | 0.43 | 1.24 | 98.3 |  |
| Example 11 | 0.11 | 0.04:0.07 | 4.5 L/1 h | 65.2 | 0.42 | 7.35 | 97.6 | 12.4 |
|  |  |  | 1.0 L/2 h | 78.2 | 0.43 | 0.98 | 98.4 |  |
| Example 12 | 0.13 |  | 4.5 L/1 h | 65.5 | 0.43 | 7.17 | 97.6 | 11.5 |
|  |  |  | 1.0 L/2 h | 78.3 | 0.43 | 0.91 | 98.6 |  |
| Comp. Example 5 | 4.09 | 0.10:3.99 | 4.5 L/1 h | 60.4 | 0.41 | 8.30 | 96.0 | 10.6 |
|  |  |  | 1.0 L/2 h | 68.5 | 0.42 | 0.82 | 97.1 |  |
| Comparative Example 6 | 3.62 |  | 4.5 L/1 h | 70.5 | 0.42 | 9.64 | 96.2 | 10.3 |
|  |  |  | 1.0 L/2 h | 79.2 | 0.42 | 2.19 | 97.5 |  |
| Comp. Example 7 | 3.45 | 0.10:3.35 | 4.5 L/1 h | 68.4 | 0.41 | 8.25 | 95.7 | 10.7 |
|  |  |  | 1.0 L/2 h | 74.7 | 0.42 | 1.21 | 97.0 |  |
| Comp. Example 8 | 3.92 |  | 4.5 L/1 h | 71.7 | 0.42 | 9.11 | 96.7 | 10.2 |
|  |  |  | 1.0 L/2 h | 78.2 | 0.43 | 1.08 | 97.4 |  |
| Comp. Example 9 | 3.89 |  | 4.5 L/1 h | 60.1 | 0.44 | 7.31 | 97.4 | 10.8 |
|  |  |  | 1.0 L/2 h | 75.3 | 0.43 | 0.81 | 98.2 |  |
| Comp. Example 10 | 4.12 | 0.08:4.04 | 4.5 L/1 h | 64.5 | 0.43 | 8.13 | 97.2 | 10.0 |
|  |  |  | 1.0 L/2 h | 77.1 | 0.43 | 1.06 | 98.3 |  |
| Comp. Example 11 | 4.13 |  | 4.5 L/1 h | 63.4 | 0.43 | 8.21 | 96.8 | 10.5 |
|  |  |  | 1.0 L/2 h | 77.0 | 0.43 | 1.29 | 97.9 |  |
| Comp. Example 12 | 3.53 | 0.07:3.46 | 4.5 L/1 h | 63.7 | 0.42 | 8.94 | 97.3 | 10.0 |
|  |  |  | 1.0 L/2 h | 77.4 | 0.43 | 1.47 | 98.0 |  |

*A:B = (R,R-configuration + S,S-configuration):(R,S-configuration)

From the data in Table 2, it can be seen that when R,R- and S,S-configuration diol ester compounds are used as the precipitating auxiliary in the preparation of the catalyst component, the content of the precipitating auxiliary diol ester in the resultant catalyst component is extremely low, but the catalyst component still has high activity and stereospecific ability, and the prepared polypropylene has a wide molecular weight distribution. Good particle morphology of the polypropylene powder has been observed, indicating that the particle morphology of the catalyst component is better.

Example 13

I. Preparation of catalyst component (1) Preparation of magnesium dichloride-alcohol adduct solution: To a reactor, in which air had been repeatedly replaced with high-purity nitrogen, were charged successively 1400 mL of isooctanol, 1400 mL of toluene and 350 g of anhydrous magnesium dichloride. The contents were allowed to react under conditions of stirring speed of 1300 rpm and temperature of 115° C. for 3.5 hours to completely dissolve the solids to form a uniform magnesium dichloride-alcohol adduct solution. 52.5 mL of tetrabutyl titanate was added thereto, and the contents were allowed to react under conditions of stirring speed of 1300 rpm and temperature of 110° C. for 1.5 hours. Then, 1960 mL of toluene was added, and the temperature was kept constant for half an hour. Then, 140 mL of toluene and 45 g of Compound 1 were added, and the mixture was allowed to react under conditions of stirring speed of 1300 rpm and temperature of 50° C. for 0.5 hours, and then cooled to room temperature to form a magnesium dichloride-alcohol adduct solution containing a precipitating auxiliary.

(2) Preparation of catalyst component: The above-prepared precipitating auxiliary-containing magnesium dichloride-alcohol adduct solution was added dropwise over 3 hours to a reactor, in which air had been well replaced with nitrogen, containing 4200 mL of titanium tetrachloride and 2800 mL of toluene. Upon the completion of the dropwise addition, the reaction mixture was stirred at −25° C. to fully react for 0.5 hours, and then heated to 110° C. over 6 hours. 35 g of di-n-butyl phthalate and 100 mL of toluene were added thereto, and the temperature was maintained at 110° C. for 2 hours. Then, the liquid was filtered off to afford a solid intermediate product. 6300 mL of toluene and 700 mL of titanium tetrachloride were added to the solid intermediate product, and the mixture was stirred at 80° C. for 1 hour, cooled to room temperature and filtered under pressure. To so-obtained solid intermediate product were added with 6300 mL of toluene and 700 mL of titanium tetrachloride, the mixture was heated to 80° C., and 112 g of di-n-butyl phthalate and 100 mL of toluene were added thereto. After maintaining at that temperature for 1 hour, the liquid was filtered off. To so-obtained solid intermediate product were added with 5600 mL of toluene and 1400 mL of titanium tetrachloride, the mixture was heated to 110° C. and stirred for 1 hour, and then the liquid was filtered off. So-obtained solid product was washed 4 times with 6000 mL of hexane and dried to afford olefin polymerization catalyst component 13.

II. Propylene polymerization

Propylene polymerization was conducted using the above-prepared catalyst component 13 by following the procedure described in Example 1. Polymerization results are shown in Table 3 below.

III. Preparation of impact copolymer polypropylene

Polymerization was performed on a horizontal gas phase polypropylene pilot plant. The polymerization reactors were two horizontal stirred reactors in series, and the polymerization method and steps were as follows:

Catalyst component 13, triethylaluminum, and isobutyldimethoxysilane, under the carrying action of propylene, were continuously added from the front of the first stirred tank to the horizontal stirred reaction tank, and polymerization was conducted under gas phase conditions to form a polypropylene homopolymer, with the reaction heat being taken away by the vaporization of sprayed propylene. The resulting polymer was discharged from the end of the stirred tank. The catalyst and polymer moved in the reactor in a manner close to the plug flow. The polymerization temperature was 66° C. or a specified temperature, and the reaction pressure was 2.3 MPa.

The homopropylene was discharged from the first reactor and transferred to the second horizontal stirred reactor through a transfer device installed between the two reactors. The polymer entered from the front end of the second stirred tank, and polymerization was conducted under the condition of ethylene introduction to produce impact copolymer polypropylene, with the reaction heat being taken away by the vaporization of sprayed propylene. During the polymerization, the molar ratio of ethylene to propylene was maintained at 0.38-0.40. The resulting polymer was discharged from the end of the stirred tank. The catalyst and polymer moved in the reactor in a manner close to the plug flow. The polymerization temperature was 66° C. or a specified temperature, and the reaction pressure was 2.2 MPa. The polymer obtained by the reaction was degassed and deactivated with wet nitrogen to obtain an impact copolymer polypropylene. The polymerization results are shown in Table 4.

Example 14

Catalyst component 14 was prepared by following the preparation procedure described in Example 13, except that in step (1), Compound 1 was replaced with Compound 2.

Propylene polymerization was conducted by following the procedure described in Example 1, except that the catalyst component 1 was replaced with the catalyst component 14. Polymerization results are shown in Table 3.

An impact copolymer polypropylene was prepared by following the procedure described in Example 13, except that the catalyst component 13 was replaced with the catalyst component 14. Polymerization results are shown in Table 4.

Example 15

Catalyst component 15 was prepared by following the preparation procedure described in Example 13, except that in step (1), Compound 1 was replaced with Compound 2 and in step (2), the di-n-butyl phthalate (DNBP) was replaced with di-isobutyl phthalate (DIBP).

Propylene polymerization was conducted by following the procedure described in Example 1, except that the catalyst component 1 was replaced with the catalyst component 15. Polymerization results are shown in Table 3.

An impact copolymer polypropylene was prepared by following the procedure described in Example 13, except that the catalyst component 13 was replaced with the catalyst component 15. Polymerization results are shown in Table 4.

Example 16

I. Preparation of catalyst component (1) Preparation of magnesium dichloride solution: To a reactor, in which air had been repeatedly replaced with high-purity nitrogen, were charged successively 350 g of anhydrous magnesium dichloride, 4667 mL of toluene, 576 mL of epichlorohydrin, and 649 mL of tributyl phosphate at room temperature. The contents were heated to 55° C. at a stirring speed of 1300 rpm and allowed to react for 3.0 hours to completely dissolve the solids, to form a uniform magnesium chloride solution.

(2) Preparation of catalyst component: The magnesium dichloride solution was cooled to −28° C., and 4100 mL of titanium tetrachloride, 290 mL of toluene, 58 g of Compound 1, and 36 g of di-n-butyl phthalate were added dropwise thereto. Upon the completion of the dropwise addition, the reaction mixture was stirred at −28° C. to fully react for 1.0 hour, and then heated to 80° C. over 4.5 hours. After maintaining at that temperature for 1.5 hours, the liquid was removed by pressure filtration, and the residual solids were washed twice with 8750 mL of toluene for each time. 51 g of di-n-butyl phthalate and 6560 mL of toluene were added, and the temperature was maintained at 80° C. for 1 hour. Then, 4375 mL of titanium tetrachloride was added, and the mixture was heated up to 110° C. and stirred for 1 hour. The liquid was removed by pressure filtration, and 4200 mL of toluene and 2800 mL of titanium tetrachloride were added. The mixture was stirred for 1 hour, and the liquid was removed by pressure filtration. Next, 4200 mL of toluene and 2800 mL of titanium tetrachloride were added, and the mixture was stirred for 1 hour. After removing the liquid by pressure filtration, the obtained solids were washed 5 times with 6000 mL of hexane and dried, to obtain olefin polymerization catalyst component 16.

II. Propylene polymerization

Propylene polymerization was conducted using the above-prepared catalyst component 16 by following the procedure described in Example 1. Polymerization results are shown in Table 3 below.

III. Preparation of impact copolymer polypropylene

An impact copolymer polypropylene was prepared using the above-prepared catalyst component 16 by following the procedure described in Example 13. Polymerization results are shown in Table 4.

Example 17

Catalyst component 17 was prepared by following the preparation procedure described in Example 16, except that in step (1), Compound 1 was replaced with Compound 2.

Propylene polymerization was conducted by following the procedure described in Example 1, except that the catalyst component 1 was replaced with the catalyst component 17. Polymerization results are shown in Table 3.

An impact copolymer polypropylene was prepared by following the procedure described in Example 13, except that the catalyst component 13 was replaced with the catalyst component 17. Polymerization results are shown in Table 4.

Example 18

Catalyst component 18 was prepared by following the preparation procedure described in Example 16, except that in step (1), Compound 1 was replaced with Compound 2 and in step (2), the di-n-butyl phthalate (DNBP) was replaced with di-isobutyl phthalate (DIBP).

Propylene polymerization was conducted by following the procedure described in Example 1, except that the catalyst component 1 was replaced with the catalyst component 18. Polymerization results are shown in Table 3.

An impact copolymer polypropylene was prepared by following the procedure described in Example 13, except that the catalyst component 13 was replaced with the catalyst component 18. Polymerization results are shown in Table 4.

Comparative Example 13

Catalyst component C13 was prepared by following the preparation procedure described in Example 13, except that in step (1), Compound 1 was replaced with Compound 3.

Propylene polymerization was conducted by following the procedure described in Example 13, except that the catalyst component 13 was replaced with the catalyst component C13. Polymerization results are shown in Table 3.

An impact copolymer polypropylene was prepared by following the procedure described in Example 13, except that the catalyst component 13 was replaced with the catalyst component C13. Polymerization results are shown in Table 4.

Comparative Example 14

Catalyst component C14 was prepared by following the preparation procedure described in Example 14, except that in step (1), Compound 2 was replaced with Compound 4.

Propylene polymerization was conducted by following the procedure described in Example 13, except that the catalyst component 13 was replaced with the catalyst component C14. Polymerization results are shown in Table 3.

An impact copolymer polypropylene was prepared by following the procedure described in Example 13, except that the catalyst component 13 was replaced with the catalyst component C14. Polymerization results are shown in Table 4.

Comparative Example 15

Catalyst component C15 was prepared by following the preparation procedure described in Example 16, except that in step (1), Compound 1 was replaced with Compound 3.

Propylene polymerization was conducted by following the procedure described in Example 1, except that the catalyst component 1 was replaced with the catalyst component C15. Polymerization results are shown in Table 3.

An impact copolymer polypropylene was prepared by following the procedure described in Example 13, except that the catalyst component 13 was replaced with the catalyst component C15. Polymerization results are shown in Table 4.

Comparative Example 16

Catalyst component C16 was prepared by following the preparation procedure described in Example 17, except that in step (1), Compound 2 was replaced with Compound 4.

Propylene polymerization was conducted by following the procedure described in Example 1, except that the catalyst component 1 was replaced with the catalyst component C16. Polymerization results are shown in Table 3.

An impact copolymer polypropylene was prepared by following the procedure described in Example 13, except that the catalyst component 13 was replaced with the catalyst component C16. Polymerization results are shown in Table 4.

TABLE 3

| Catalyst | Content of diol ester wt % | *A:B | Polymerization conditions | Ac kgPP/gcat | BD g/cm³ | MI g/10 min | II % |
|---|---|---|---|---|---|---|---|
| Example 13 | 0.12 | 0.05:0.07 | 4.5 L/1 h | 71.4 | 0.43 | 24.7 | 97.6 |
|  |  |  | 1.0 L/2 h | 82.2 | 0.43 | 6.01 | 98.5 |
| Example 14 | 0.13 | 0.06:0.07 | 4.5 L/1 h | 71.0 | 0.44 | 21.2 | 97.5 |
|  |  |  | 1.0 L/2 h | 89.4 | 0.44 | 5.50 | 98.8 |
| Example 15 | 0.10 |  | 4.5 L/1 h | 69.1 | 0.42 | 31.8 | 97.5 |
|  |  |  | 1.0 L/2 h | 78.2 | 0.43 | 5.73 | 98.6 |
| Example 16 | 0.19 | 0.09:0.10 | 4.5 L/1 h | 68.0 | 0.42 | 22.6 | 97.5 |
|  |  |  | 1.0 L/2 h | 80.1 | 0.42 | 5.38 | 98.3 |
| Example 17 | 0.18 |  | 4.5 L/1 h | 69.8 | 0.42 | 23.0 | 97.7 |
|  |  |  | 1.0 L/2 h | 81.2 | 0.42 | 6.46 | 98.6 |
| Example 18 | 0.16 | 0.07:0.09 | 4.5 L/1 h | 66.3 | 0.41 | 26.8 | 97.3 |
|  |  |  | 1.0 L/2 h | 79.6 | 0.42 | 5.96 | 98.2 |
| Comp. Example 13 | 4.28 | 0.10:4.18 | 4.5 L/1 h | 68.0 | 0.42 | 23.6 | 97.4 |
|  |  |  | 1.0 L/2 h | 76.9 | 0.43 | 5.41 | 98.2 |
| Comp. Example 14 | 3.92 | 0.08:3.84 | 4.5 L/1 h | 71.2 | 0.41 | 20.2 | 97.2 |
|  |  |  | 1.0 L/2 h | 82.5 | 0.42 | 3.68 | 98.3 |
| Comp. Example 15 | 3.88 |  | 4.5 L/1 h | 65.4 | 0.42 | 22.4 | 97.5 |
|  |  |  | 1.0 L/2 h | 77.8 | 0.42 | 6.01 | 98.0 |
| Comp. Example 16 | 4.17 |  | 4.5 L/1 h | 66.4 | 0.41 | 21.9 | 97.1 |
|  |  |  | 1.0 L/2 h | 78.6 | 0.42 | 4.73 | 98.2 |

A:B = (R,R-configuration + S,S-configuration):(R,S-configuration)

TABLE 4[a]

| catalyst | Ac kgPP/gcat | BD g/cm3 | MI g/10 min | C2= % | RCC2 % | RC % |
|---|---|---|---|---|---|---|
| Example 13 | 42.7 | 0.43 | 2.96 | 9.33 | 43.7 | 21.40 |
| Example 14 | 44.4 | 0.43 | 2.54 | 10.1 | 44.2 | 22.85 |
| Example 15 | 40.7 | 0.42 | 2.73 | 10.0 | 44.2 | 22.62 |
| Example 16 | 43.6 | 0.42 | 2.53 | 10.2 | 44.6 | 22.87 |
| Example 17 | 44.7 | 0.42 | 2.76 | 10.0 | 43.9 | 22.78 |
| Example 18 | 42.9 | 0.41 | 2.79 | 10.3 | 44.7 | 23.04 |
| Comp. Example 13 | 41.4 | 0.42 | 2.46 | 9.09 | 42.7 | 21.28 |
| Comp. Example 14 | 42.8 | 0.42 | 2.71 | 9.13 | 42.1 | 21.69 |
| Comp. Example 15 | 41.6 | 0.42 | 2.93 | 9.36 | 42.3 | 22.12 |
| Comp. Example 16 | 42.5 | 0.41 | 2.48 | 9.47 | 42.2 | 22.44 |

[a]C2 = is the total ethylene content in polypropylene copolymer, RCC2 is ethylene content in rubber phase, and RC is rubber phase content in polypropylene copolymer.

From the data in Table 3, it can be seen that when R,R- and S,S-configuration diol ester compounds are used as the precipitating auxiliary in the preparation of the catalyst component, the content of the precipitating auxiliary diol ester in the resultant catalyst component is extremely low and, at the same time, the catalyst component exhibits high polymerization activity and high stereospecific ability. Good particle morphology of the polypropylene powder has been observed, indicating that the particle morphology of the catalyst component is better.

From the data in Table 4, it can be seen that when using the catalyst component of the present invention to prepare impact copolymer polypropylene, under the conditions of the same ethylene/propylene molar ratio, the ethylene content in the prepared copolymer polypropylene and the ethylene content in the rubber phase are higher, indicating that the catalyst of the present invention has better copolymerization ability.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. The present invention has been described above with reference to many embodiments and specific examples. Considering the above detailed description, many variations will be apparent for those skilled in the art. All of such variations will be within the scope of the whole purpose of the appended claims.

In this disclosure, whenever a composition, an element or a group of elements is preceded with the transitional phrase "comprising", it is understood that we also contemplate the same composition, element or group of elements with transitional phrases "consisting essentially of", "consisting of", "selected from the group consisting of", or "is" preceding the recitation of the composition, element, or elements, and vice versa.

We claim:

1. A catalyst component for olefin polymerization, comprising magnesium, titanium, a halogen, an internal electron donor compound and a precipitating auxiliary, wherein the precipitating auxiliary comprises at least one precipitating auxiliary a represented by formula (I):

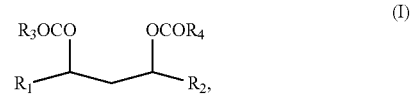

wherein $R_1$ and $R_2$ are each independently selected from the group consisting of $C_1$-$C_{10}$ alkyl, $C_3$-$C_{10}$ cycloalkyl, $C_6$-$C_{10}$ aryl and $C_7$-$C_{10}$ aralkyl, either substituted or unsubstituted; $R_3$ and $R_4$ are each independently selected from the group consisting of $C_1$-$C_{20}$ alkyl, $C_3$-$C_{20}$ cycloalkyl, $C_6$-$C_{20}$ aryl and $C_7$-$C_{20}$ aralkyl, either substituted or unsubstituted, and wherein a content of the precipitating auxiliary a is larger than zero and lower than 1.0 wt %, based on a total weight of the catalyst component, the precipitating auxiliary a represented by formula (I) comprising isomers represented by formula (I-a) and/or formula (I-b):

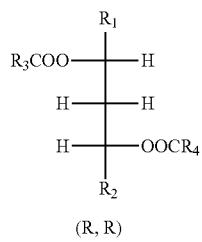

(I-a)

(R, R)

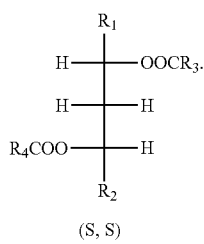

(I-b)

(S, S)

2. The catalyst component of claim 1, wherein in formula (I), $R_1$ and $R_2$ are each independently selected from the group consisting of $C_1$-$C_8$ alkyl, $C_3$-$C_8$ cycloalkyl and $C_6$-$C_8$ aryl, either substituted or unsubstituted; $R_3$ and $R_4$ are each independently selected from the group consisting of $C_1$-$C_{10}$ alkyl, $C_3$-$C_{10}$ cycloalkyl and $C_6$-$C_{10}$ aryl, either substituted or unsubstituted.

3. The catalyst component of claim 1, wherein the content of the precipitating auxiliary a is larger than zero and lower than 0.5 wt %, based on the total weight of the catalyst component.

4. The catalyst component of claim 1, wherein the precipitating auxiliary further comprises precipitating auxiliary b represented by formula (II):

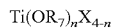 (II), wherein each $R_7$ is independently selected from the group consisting of $C_1$-$C_{10}$ alkyl and $C_3$-$C_{10}$ cycloalkyl, each X is a halogen, and n is 1, 2, 3 or 4.

5. The catalyst component of claim 4, wherein the internal electron donor compound comprises at least one selected from the group consisting of:

2,2-dihydrocarbyl-1,3-propylene glycol dimethyl ether compounds represented by formula (III):

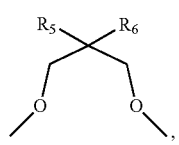

(III)

wherein $R_5$ and $R_6$ are each independently selected from the group consisting of $C_1$-$C_{10}$ alkyl, $C_3$-$C_{10}$ cycloalkyl, $C_6$-$C_{10}$ aryl and $C_7$-$C_{10}$ alkaryl, either substituted or unsubstituted; $R_5$ and $R_6$ are optionally linked to form a ring;

diethyl 2-cyano-2,3-dihydrocarbylsuccinate compounds represented by formula (III'):

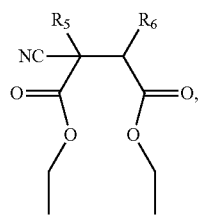

(III')

wherein $R_5$ and $R_6$ are each independently selected from the group consisting of $C_1$-$C_{10}$ alkyl, $C_3$-$C_{10}$ cycloalkyl, $C_6$-$C_{10}$ aryl and $C_7$-$C_{10}$ aralkyl, either substituted or unsubstituted; and phthalate compounds represented by formula (III"):

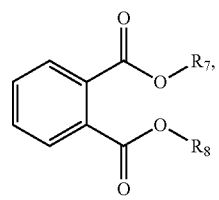

(III")

wherein $R_7$ and $R_8$ are each independently selected from the group consisting of $C_1$-$C_{10}$ alkyl, $C_3$-$C_{10}$ cycloalkyl, $C_6$-$C_{10}$ aryl and $C_7$-$C_{10}$ alkaryl, either substituted or unsubstituted.

6. The catalyst component of claim 1, wherein, a content of the titanium ranges from 1.0 wt % to 8.0 wt %; a content of the magnesium ranges from 10.0 wt % to 70.0 wt %; a content of the halogen ranges from 20.0 wt % to 90.0 wt %; and a content of the internal electron donor compound ranges from 2.0 wt % to 30.0 wt %, based on the total weight of the catalyst component.

7. The catalyst component of claim 1, wherein the catalyst component comprises a reaction product of a magnesium compound, a titanium compound, at least one internal electron donor compound and a precipitating auxiliary comprising at least one precipitating auxiliary a represented by formula (I), and wherein, relative to one mole of the magnesium compound, an amount of the precipitating auxiliary a used ranges from 0.005 to 0.3 moles, and the precipitating auxiliary a comprises isomers represented by formula (I-a) and/or formula (I-b) in an amount of more than 80 wt %, based on a total weight of the precipitating auxiliary a.

8. The catalyst component of claim 1, wherein in the formula (I), $R_1$ and $R_2$ are each independently a substituted or unsubstituted $C_1$-$C_4$ alkyl group; $R_3$ and $R_4$ are each independently selected from the group consisting of $C_5$-$C_{10}$ alkyl, $C_5$-$C_{10}$ cycloalkyl, $C_6$-$C_{10}$ aryl and $C_7$-$C_{10}$ aralkyl, either substituted or unsubstituted.

9. The catalyst component of claim 1, wherein the content of the precipitating auxiliary a is larger than zero and lower than 0.2 wt %, based on the total weight of the catalyst component.

10. The catalyst component of claim 1, wherein the catalyst component comprises a reaction product of a magnesium compound, a titanium compound, at least one internal electron donor compound and a precipitating auxiliary comprising at least one precipitating auxiliary a represented by formula (I);

wherein, relative to one mole of the magnesium compound, an amount of the precipitating auxiliary a used ranges from 0.01 to 0.05 moles, and the precipitating auxiliary a comprises isomers represented by formula (I-a) and/or formula (I-b) in an amount of more than 90 wt %, based on a total weight of the precipitating auxiliary a.

11. A method for preparing the catalyst component for olefin polymerization according to claim 1, comprising the steps of:
1) dissolving a magnesium compound in a solvent system to form a magnesium compound-containing solution;
2) precipitating particulate magnesium-containing solids from the magnesium compound-containing solution in the presence of a precipitating auxiliary, wherein the precipitating auxiliary comprises at least one precipitating auxiliary a represented by formula (I):

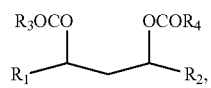
(I)

wherein $R_1$ and $R_2$ are each independently selected from the group consisting of $C_1$-$C_{10}$ alkyl, $C_3$-$C_{10}$ cycloalkyl, $C_6$-$C_{10}$ aryl and $C_7$-$C_{10}$ aralkyl, either substituted or unsubstituted; $R_3$ and $R_4$ are each independently selected from the group consisting of $C_1$-$C_{20}$ alkyl, $C_3$-$C_{20}$ cycloalkyl, $C_6$-$C_{20}$ aryl and $C_7$-$C_{20}$ aralkyl, either substituted or unsubstituted,
wherein the precipitating auxiliary a represented by formula (I) comprises isomers represented by formula (I-a) and/or formula (I-b):

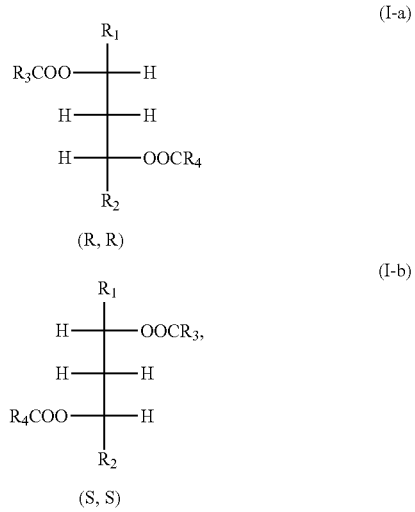

in an amount of more than 80 wt %, based on a total weight of the precipitating auxiliary a represented by formula (I); and
3) supporting a titanium-based active component on the particulate magnesium-containing solids to form a solid catalyst component.

12. The method of claim 11, comprising the following steps:
(1) reacting a magnesium compound with an alcohol compound, optionally in the presence of an inert hydrocarbon solvent, to obtain a uniform magnesium compound-alcohol adduct solution;
(2) reacting the magnesium compound-alcohol adduct solution from step (1) with a first titanium compound in the presence of the precipitating auxiliary to obtain a solid precipitate-containing mixture;
(3) contacting the solid precipitate-containing mixture from step (2) with a first internal electron donor compound to obtain a suspension;
(4) subjecting the suspension from step (3) to solid-liquid separation to obtain a first solid intermediate product, and contacting the obtained first solid intermediate product with a second titanium compound and optionally a second internal electron donor compound to provide a mixture;
(5) subjecting the mixture from step (4) to solid-liquid separation to obtain a second solid intermediate product, and treating the second solid intermediate product with a third titanium compound to form a solid catalyst component; and
(6) recovering the solid catalyst component,
or comprising the following steps:
(1) contacting a magnesium compound with an organic epoxy compound and an organic phosphorus compound, optionally in the presence of an inert hydrocarbon solvent, to form a uniform magnesium compound solution;
(2) contacting the magnesium compound solution from step (1) with a first titanium compound and a first internal electron donor compound in the presence of the precipitating auxiliary to obtain a solid precipitate-containing suspension;
(3) subjecting the solid precipitate-containing suspension from step (2) to solid-liquid separation to obtain a first solid intermediate product, and contacting the first solid intermediate product with a second titanium compound and optionally a second internal electron donor compound to provide a mixture;
(4) subjecting the mixture from step (3) to solid-liquid separation to obtain a second solid intermediate product;
(5) treating the second solid intermediate product with a third titanium compound 1-4 times to form a solid catalyst component; and
(6) recovering the solid catalyst component.

13. The method of claim 11, wherein the precipitating auxiliary a represented by formula (I) comprises isomers represented by formula (I-a) and/or formula (I-b) in an amount of more than 90 wt %, based on the total weight of the precipitating auxiliary a represented by formula (I).

14. A catalyst for olefin polymerization, comprising:
1) the catalyst component of claim 1; and
2) an alkylaluminum compound,
wherein a molar ratio of the component 1) to the component 2), in terms of titanium:aluminum, is (5-5000):1.

15. A catalyst for olefin polymerization of claim 14, further comprising an external electron donor compound.

16. A pre-polymerized catalyst for olefin polymerization, comprising a prepolymer obtained by conducting pre-polymerization using the catalyst component of claim 1 and an olefin, wherein the prepolymer has a prepolymerization multiple of from 5 to 1000 g of polyolefin/g of catalyst component, and the olefin used in the pre-polymerization is ethylene or propylene.

17. A process for polymerizing an olefin of formula $CH_2=CHR$, wherein R is hydrogen, a $C_1$-$C_6$ alkyl or aryl, the process comprising polymerizing the olefin in the presence of the catalyst component of claim 1 to form a polyolefin polymer; and recovering the polyolefin polymer.

18. A pre-polymerized catalyst for olefin polymerization, comprising a prepolymer obtained by conducting pre-polymerization using the catalyst of claim 14 and an olefin, wherein the prepolymer has a prepolymerization multiple of from 5 to 1000 g of polyolefin/g of catalyst component, and the olefin used in the pre-polymerization is ethylene or propylene.

19. A process for polymerizing an olefin of formula $CH_2=CHR$, wherein R is hydrogen, a $C_1$-$C_6$ alkyl or aryl, the process comprising polymerizing the olefin in the presence of the catalyst of claim 14 to form a polyolefin polymer; and recovering the resulting polyolefin polymer.

20. A process for polymerizing an olefin of formula $CH_2=CHR$, wherein R is hydrogen, a $C_1$-$C_6$ alkyl or aryl, the process comprising polymerizing the olefin in the presence of the pre-polymerized catalyst of claim 16 to form a polyolefin polymer; and recovering the resulting polyolefin polymer.

\* \* \* \* \*